United States Patent
Yu et al.

(10) Patent No.: US 6,314,361 B1
(45) Date of Patent: Nov. 6, 2001

(54) OPTIMIZATION ENGINE FOR FLIGHT ASSIGNMENT, SCHEDULING AND ROUTING OF AIRCRAFT IN RESPONSE TO IRREGULAR OPERATIONS

(75) Inventors: Gang Yu; Michael Francis Arguello, both of Austin, TX (US)

(73) Assignee: CALEB Technologies Corp., Austin, TX (US)

( * ) Notice: Subject to any disclaimer, the term of this patent is extended or adjusted under 35 U.S.C. 154(b) by 0 days.

(21) Appl. No.: 09/364,157

(22) Filed: Jul. 30, 1999

(51) Int. Cl.[7] .................................................. G06F 19/00
(52) U.S. Cl. ........................ 701/120; 701/117; 701/202; 709/100; 705/5; 705/6; 703/13; 703/22
(58) Field of Search ..................................... 701/120, 200, 701/202; 703/13, 22; 705/5, 6, 8; 707/1; 709/100

(56) References Cited

U.S. PATENT DOCUMENTS

| | | |
|---|---|---|
| 4,775,936 | 10/1988 | Jung. |
| 4,845,625 | 7/1989 | Stannard. |
| 4,862,357 | 8/1989 | Ahlstrom et al.. |
| 4,943,919 | 7/1990 | Aslin et al.. |
| 5,237,499 | 8/1993 | Garback. |
| 5,253,165 | 10/1993 | Leiseca et al.. |
| 5,255,184 | 10/1993 | Hornick et al.. |
| 5,265,023 | 11/1993 | Sokkappa. |
| 5,270,920 | 12/1993 | Pearse et al.. |
| 5,270,921 | 12/1993 | Hornick. |
| 5,570,283 | 10/1996 | Shoolery. |
| 5,652,867 | 7/1997 | Barlow et al.. |
| 5,797,113 | 8/1998 | Kambe. |
| 5,797,127 | 8/1999 | Walker. |
| 5,805,446 | 9/1999 | Hatakeyama. |
| 5,897,620 | 4/1999 | Walker. |
| 5,913,912 | 6/1999 | Nishimura. |

FOREIGN PATENT DOCUMENTS

| | | |
|---|---|---|
| 0743580A1 | 11/1996 | (EP). |
| 0826946A1 | 3/1998 | (EP). |

OTHER PUBLICATIONS

Michael F. Arguello, Jonathan F. Bard, and Gang Yu "Models And Methods For Managing Airline Irregular Operations", Operations Research In The Airline Industry, pp. 1–45, Kluwer Academic Publishers (1998), United States. No month.

(List continued on next page.)

Primary Examiner—Yonel Beaulieu
(74) Attorney, Agent, or Firm—Gerald E. Lester

(57) ABSTRACT

An automated, real-time decision support system for reassigning, rescheduling, and rerouting aircraft in response to flight operation disruptions, in which sets of optimal solutions are provided through use of evaluation statistics to assist operations management in selecting the optimal solution best conforming to operational constraints and user requirements. Solutions are generated through the execution of unary operations, binary operations, three-way operations, and reverse binary operations on grounded aircraft routes, available aircraft routes, and phantom routes which implicitly cancelled flights. Solutions are evaluated for feasibility with respect to operations constraints and user requirements. Marginal value calculators are used to differentiate feasible solutions and identify optimal solutions. The marginal value calculators are dynamic, hierarchical calculators that permit use of multiple, prioritized, and weighted route and operation attributes in comparing solution values. Marginal value calculators are selected by means of a decision tree.

21 Claims, 11 Drawing Sheets

OTHER PUBLICATIONS

Michael F. Arguello, Jonathan F. Bard, and Gang Yu "A Grasp for Aircraft Routing in Response to Groundings and Delays", Journal of Combinatorial Optimization 5, pp. 211–228 (1971), The Netherlands.

Gang Yu, "An Optimization Model for Airlines' Irregular Operations Control", Proceeding Of The International Symposium On Optimization Applications In Management And Engineering (1995), Beijing, PRC.

Ahmad I. Z. Jarrah, Gang Yu, Nirup Krishnamurthy, and Anada Rakshit, "A Decision Support Framework for Airline Flight Cancellations and Delays", Transportation Science, vol. 27, No. 3, pp. 266–280, Operations Research Society of America (1993) United States.

Michael Arguello, Jonathan Bard, and Gang Yu, "An Optimization Model For Aircraft Routing In Response To Groundings And Delays", Submitted For Publication To Transportation Science, (Mar. 1997), United States.

Benjamin G. Thengvall, Jonathan F. Bard, and Gang Yu, "Balancing User Preferences For Aircraft Schedule Recovery During Airline Irregular Operations" submitted for publication to IIE Transactions (Mar. 1988) United States.

Dusan Teodorovic and Goran Stojkovic, "Model To Reduce Airline Schedule Disturbances", Journal of Transportation Engineering, Jul./Aug. (1995), United States.

Kalyan T. Talluri, "Swapping Application In A Daily Airline Fleet Assignment", Transportation Science, vol. 30, No. 3, Aug. (1996) United States.

Gerald G. Brown, Robert F. Dell, and R. Kevin Wood, "Optimization And Persistence", Institute For Operations Research, Interfaces 27:5 Sep.–Oct., pp. 15–37 (1997), United States.

Jia–Ming Cao and Adib Kanafani, "Real–Time Decision Support For Integration Of Airline Flight Cancellations And Delays Part I: Mathematical Formulation", Transportation Planning and Technology, vol. 10, pp. 183–199 (1997) United States. No month.

Jia–Ming Cao and Adib Kanafani, "Real–Time Decision Support For Integration Of Airline Flight Cancellations And Delays Part II: Algorithm And Computational Experiments", Transportation Planning And Technology, vol. 20, pp. 201–217 (1997) United States. no month.

Mark S. Daskin and Nichlaos D. Panayotopoulos, "A Lagrangian Relaxation Approach to Assigning Aircraft to Routes in Hub and Spoke Networks", Transportation Science, vol. 23, pp. 91–99 (1989), United States. No month.

Ananda Rakshit, Nirup Krishnamurthy and Gang Yu, "System Operations Advisor: A Real–Time Decision Support System for Managing Airline Operations as United Airlines", Interfaces 26:2 Mar.–Apr., pp. 50–58, Institute for Operations Research and the Management Sciences (1996), United States. No month.

Dusan Teodorovic and Goran Stojkovic, "Model For Operational Daily Airline Scheduling", Transportation Planning and Technology, vol. 14, pp. 273–285, Fordon and Breach Science Publishers, Inc. (1990) United Kingdom. No month.

Dusan Teodorovic and Slobodan Guberinic, "Optimal dispatching strategy on an airline network after a schedule perturbation", North–Holland European Jouranl of Operational Research 15, pp. 178–182, Elsevier Science Publishers B.V. (1984) North–Holland. No month.

Alberto Vasquez–Marquez, "American Airlines Arrival Slot Allocation System (ASAS)", Interfaces 21:1 Jan.–Feb., pp. 42–61, The Institute of Management Sciences (1991) United States. No month.

Peter B. Vranas, Dimitris J. Bertsimas, and Amedeo R. Odoni, "The Multi–Airport Ground–Holding Problem In Air Traffic Control", Operations Research, vol. 42, No. 2, Mar.–Apr., Operations Research Society of America (1994) United States. No month.

Shangyao Yuan and Chung–Gee Lin, "Airline Scheduling for the Temporary Closure of Airports", Transportation Science, vol. 31, No. 1, pp. 72–82, Institute for Operations Research and the Management Sciences (1997) Taiwan.

Shangyao Yan and Yu–Ping Tu, "Multifleet routing and multistop flight scheduling for schedule perturbation", European Journal of Operational Research 103, pp. 155–169(1997), Elsevier Science B.V., United Kingdom. No month.

Shangyao Yan and Dah–Hwei Yang, "A Decision Support Framework For Handling Schedule Perturbation", Transprn.–B, vol. 30, No. 6, pp. 405–419, Elsevier Science Ltd. (1996) Great Britain. No month.

Shangyao Yan and Hwei–Fwa Young, "A Decision Support Framework For Multi–Fleet Routing and Multi–Stop Flight Scheduling", Transpn. Res.–A, vol. 30, No. 5, pp. 379–398, Elsevier Science Ltd. (1996), Great Britain. No month.

Gang Yu, "Real–Time Mission–Critical Decision Support Systems for Managing and Controlling Airlines' Operations", Proceedings of International Conference On Management Science and The Economic Development China (1996) Hong Kong. No month.

Songjun Luo and Gang Yu, "On the Airline Schedule Perturbation Problem Caused by the Ground Delay Program", Transportation Science, vol. 31, No. 4, Nov. 1997, Institute for Operations Researchand the Management Sciences (1997), United States. No month.

OPTIMIZATION ENGINE FOR FLIGHT ASSIGNMENT, SCHEDULING AND ROUTING OF AIRCRAFT IN RESPONSE TO IRREGULAR OPERATIONS

FIELD OF THE INVENTION

The invention is related to decision support systems for assisting in the rerouting and rescheduling of aircraft in light of flight schedule disruptions, and more particularly to an automated, real time, interactive decision support system which provides sets of optimal aircraft assignments, schedules, and routes for evaluation by operations management in the event of a flight schedule problem.

BACKGROUND OF THE INVENTION

Airlines must regularly develop flight schedules for each of their aircraft, with each flight requiring the designation of an originating city, a departure time, a destination, and an arrival time. The ordered sequence of flights to which an aircraft is assigned is called an aircraft route. The goal is to develop a collection of aircraft routes that use available aircraft to service all scheduled flights. When an aircraft is unexpectedly diverted, delayed or grounded, aircraft must be reassigned, rescheduled, and rerouted within an as short as possible recovery period to minimize lost revenues, passenger inconvenience, and operational costs.

Prior publications of general interest as background information include the following: "Model To Reduce Airline Schedule Disturbances", by Dusan Teodorovic and Goran Stojkovic, Journal of Transportation Engineering, July/August (1995); "Swapping Applications In A Daily Airline Fleet Assignment", by Kalyan T. Talluri, Transportation Science, Vol. 30, No.3, August (1996); "Optimization And Persistence", by Gerald G. Brown, Robert F. Dell, and R. Kevin Wood, Institute For Operations Research, Interfaces 27: 5 September–October, pp. 15–37 (1997). "Real-Time Decision Support For Integration Of Airline Flight Cancellations And Delays Part I: Mathematical Formulation", by Jia-Ming Cao and Adib Kanafani, Transportation Planning and Technology, Vol.20, pp. 183–199 (1997); "Real-Time Decision Support For Integration Of Airline Flight Cancellations And Delays Part II: Algorithm And Computational Experiments", by Jia-Ming Cao and Adib Kanafani, Transportation Planning and Technology, Vol. 20, pp. 201–217 (1997); "A Lagrangian Relaxation Approach to Assigning Aircraft to Routes in Hub and Spoke Networks", by Mark S. Daskin and Nichlaos D. Panayotopoulos, Transportation Science, vol.23, pp. 91–99, (1989); "System Operations Advisor: A Real-Time Decision Support System for Managing Airline Operations at United Airlines" by Ananda Rakshit, Nirup Krishnamurthy and Gang Yu, Interfaces 26: 2 March–April, pp.50–58, Institute for Operations Research and the Management Sciences (1996); "Model For Operational Daily Airline Scheduling", by Dusan Teodorovic and Goran Stojkovic, Transportation Planning and Technology, vol. 14, pp.273–285, Gordon and Breach Science Publishers Inc. (1990); "Optimal dispatching strategy on an airline network after a schedule perturbation", by Dusan Teodorovic and Slobodan Guberinic, North-Holland European Journal of Operational Research 15, pp. 178–182, Elsevier Science Publishers B.V. (1984); "American Airlines Arrival Slot Allocation System (ASAS)", by Alberto Vasquez-Marquez, Interfaces 21: 1 January–February, pp. 42–61, The Institute of Management Sciences (1991); "The Multi-Airport Ground-Holding Problem In Air Traffic Control", by Peter B. Vranas, Dimitris J. Bertsimas, and Amedeo R. Odoni, Operations Research, vol. 42, No. 2, March–April, Operations Research Society of America (1994); "Airline Scheduling for the Temporary Closure of Airports", by Shangyao Yan and Chung-Gee Lin, Transportation Science, vol. 31, No. 1, pp. 72–82, Institute for Operations Research and the Management Sciences (1997); "Multifleet routing and multistop flight scheduling for schedule perturbation", by Shangyao Yan and Yu-ping Tu, European Journal of Operational Research 103, pp. 155–169 (1997); "A Decision Support Framework For Handling Schedule Perturbation", by Shangyao Yan and Dah-Hwei Yang, Transprn.-B, vol. 30, No. 6, pp.405–419, Elsevier Science Ltd. (1996); "A Decision Support Framework For Multi-Fleet Routing And Multi-Stop Flight Scheduling", by Shangyao Yan and Hwei-Fwa Young, Transpn. Res.-A, vol. 30, No. 5, pp. 379–398, Elsevier Science Ltd. (1996); "Real-Time Mission-Critical Decision Support Systems for Managing and Controlling Airlines' Operations", by Gang Yu, Proceedings of International Conference On Management Science and The Economic Development of China (Hong Kong, 1996); and "On the Airline Schedule Perturbation Problem Caused by the Ground Delay Program", by Songjun Luo and Gang Yu, Transportation Science, vol. 31, No. 4, November 1997, Institute for Operations Research and the Management Sciences (1997).

In "Models And Methods For Managing Airline Irregular Operations", by Michael F. Arguello, Jonathan F. Bard, and Gang Yu, Operations Research In The Airline Industry, pp 1–45, Kluwer Academic Publishers, (1998); and "A GRASP for Aircraft Routing in Response to Groundings and Delays", by Michael F. Arguello, Jonathan F. Bard, and Gang Yu, Journal of Combinatorial Optimization 5, pp 211–228 (1997), a greedy randomized adaptive search procedure (GRASP) including GRASP operations "simple circuit cancellation", "flight route augmentation", and "partial route exchange" are presented. Further, the above publications provide a framework for testing feasibility and calculating marginal values.

The present invention is an improvement over the teachings of the above publications in that a new operation, the Uncancel Operation, as well as combined operations have been created to afford a more diverse and valuable set of solutions. In particular, the Cancel and Uncancel Operation, the Move and Cancel from Source Operation, the Move and Cancel from Target Operation, the Move and Cancel from Source and Target Operation, the Move and Uncancel to Source Operation, the Move and Uncancel to Target Operation, the Swap and Cancel from Source Operation, the Swap and Cancel from Target Operation, the Swap and Cancel from Source and Target Operation, the Swap and Uncancel to Source Operation, the Swap and Uncancel to Target Operation, and the Three-Way Swap Operation afford a user a much broader neighborhood of operations from which more numerous solutions may be generated.

Although the above GRASP publication discloses the use of a marginal value calculator having a simple cost minimization objective., the marginal value calculator used in the current invention, by way of contradistinction, is defined as a dynamic hierarchical calculator that permits the use of multiple, prioritized, and weighted objectives for determining the value of one solution with respect to another.

As a further difference, the above GRASP publication describes a coarse neighborhood search procedure, whereas the method embodied in the current invention is a direct and more comprehensive procedure for deriving a set of solutions.

Furthermore, the above GRASP publication describes a search procedure that visits many solutions, but requires stopping criteria in order to terminate. In addition, the use of a restricted candidate list, and a randomized selection from the list to choose a new solution is described. The current invention does not use a restricted candidate list, has no randomization techniques, and terminates for each marginal value calculator selected upon generation of a first solution that repairs every Grounded Aircraft Route. Further, in the current invention multiple solutions are generated through the use of multiple marginal value calculators, and a decision tree is used for selection among plural marginal value calculators.

In "An Optimization Model for Airlines' Irregular Operations Control", by Gang Yu, Proceedings Of The International Symposium On Optimization Applications In Management And Engineering (Beijing, 1995), the author presents a model for re-routing aircraft in response to irregular operations, but no method for solving the model. The model is a pure mathematical model for multi-commodity network flow with side constraints. Although the model permits canceling, delaying, and swapping of flights, it is not easily solvable, and techniques have yet to be developed for obtaining optimal solutions from the model in real-time. In contrast, the present invention provides a method for solving aircraft re-routing problems within seconds. Further, the method is unrelated to multi-commodity network flow solution techniques.

"A Decision Support Framework for Airline Flight Cancellations and Delays", by Ahmad I. Z. Jarrah, Gang Yu, Nirup Krishnamurthy, and Anada Rakshit, Transportation Science, vol. 27, No.3, August, pp 266–280, Operations Research Society of America (1993), proposes two separate models for re-routing aircraft in response to irregular operations. One model is provided to manage flight delays, and the other contemplates only flight cancellations. The models are presented as minimum cost network flow problems that can be solved readily. However, no integrated cancellation and delay process is presented. In contrast, the present invention addresses both cancellations and delays as it generates solutions, and handles all user requirements and operations constraints within a unified framework. Further, the current invention is not related to minimum cost network flow solution techniques.

"An Optimization Model For Aircraft Routing In Response To Groundings And Delays", by Michael F. Arguello, Jonathan F. Bard, and Gang Yu, submitted for publication (March, 1997), introduces a time-band model for re-routing aircraft in response to irregular operations. The model approximates the operational problem, integrates the handling of delays and cancellations, and is readily solvable. Further, the model is a minimum cost network flow with side constraints, and is solved through use of traditional network flow algorithms that are commercially available in general purpose network and integer program solvers. However, there is no constraint to affect a minimum number of flight routes, and no ability to meet real-time requirements.

In "Balancing User Preferences for Aircraft Schedule Recovery During Airline Irregular Operations", by Benjamin G. Thengvall, Jonathan F. Bard, and Gang Yu, submitted for publication (March, 1998), the authors present a time-space network for modeling the irregular operations re-routing of aircraft. The resulting model handles delays and cancellations simultaneously, and attempts to limit the disruptions to the original aircraft routings. This model is a network flow with side constraints, and it is solved with traditional network flow and integer programming algorithms. Once the problem is modeled, the corresponding mathematical program is solved with commercial, general purpose network and integer program solvers. In contrast, the invention under consideration within the Aircraft Optimization Engine solves the problem at hand differently. It employs a process that generates solutions through the execution of operations on the grounded aircraft routes. It also solves the problem more robustly because it does not limit flight delays to specific time intervals as in the above paper. Additionally, the current invention is more successful at limiting the number of disrupted routings due to the design of the operations. Furthermore, the operations can be executed much more quickly to generate solutions than the methods required to solve network flow models.

The four publications listed above propose network models for representing the underlying operational problem, and rely on network flow techniques for their solution. In contrast, the invention under consideration within the Aircraft Optimization Engine is a solution construction system that generates solutions through the execution of operations on the grounded aircraft routes. Neither the operations, nor the feasibility, nor the marginal value evaluators are related to network flow modeling or their optimization methods.

Additionally, the current invention solves operations problems in real-time by generating solutions through the execution of operations on grounded aircraft routes. Further, the current invention affects no more than two other available flight routes for every grounded flight route that is corrected. Lastly, the current invention is not related to minimum cost network flow or integer program solution techniques.

SUMMARY OF THE INVENTION

An automated, real-time, decision support system for reassigning, rescheduling, and rerouting aircraft in response to flight operation disruptions, in which sets of optimal solutions are provided through use of evaluation statistics such as the quantity of cancelled flights, cancelled passengers, delayed flights, delayed passengers, delayed flight minutes, swapped flights, and displaced passengers, as well as flight revenue and the costs related to flight operations, flight cancellations, flight delay minutes, flight swaps, and displaced passengers, to assist operations management in selecting the optimal solution best conforming to operational constraints and user requirements.

In one aspect of the invention, an integrated combination of operations are applied to grounded aircraft routes and available aircraft routes to effect flight leg moves, flight leg swaps, flight leg cancellations, flight delays, and flight leg creations in generating solutions to repair a grounded flight route.

In another aspect of the invention, the integrated combination of operations include unary operations, binary operations, three-way operations, and reverse binary operations.

In still another aspect of the invention, the unary operations include do-nothing operations, cancel operations, uncancel operations, and cancel and uncancel operations.

In yet another aspect of the invention, the binary operations include move operations, swap operations, move and cancel from source operations, move and cancel from target operations, move and cancel from source and target operations, move and uncancel to source operations, move and uncancel to target operations, swap and cancel operations, swap and cancel from source and target operations, and swap and uncancel operations.

In a further aspect of the invention, a neighborhood or set of solutions is generated which are first tested for feasibility (conformance with user requirements and operations constraints), and thereafter the feasible solutions are valued through use of marginal value calculators that are selected by means of a decision tree. The values of the feasible solutions are compared to determine an optimal solution.

In a still further aspect of the invention, the marginal value calculators are dynamic, hierarchical calculators that permit use of multiple, prioritized, and weighted route and operation attributes in comparing solution values.

In yet a further aspect of the invention, the process of generating solutions may be streamlined through application of solution conditions.

DESCRIPTION OF PREFERRED EMBODIMENTS

Figure 1:
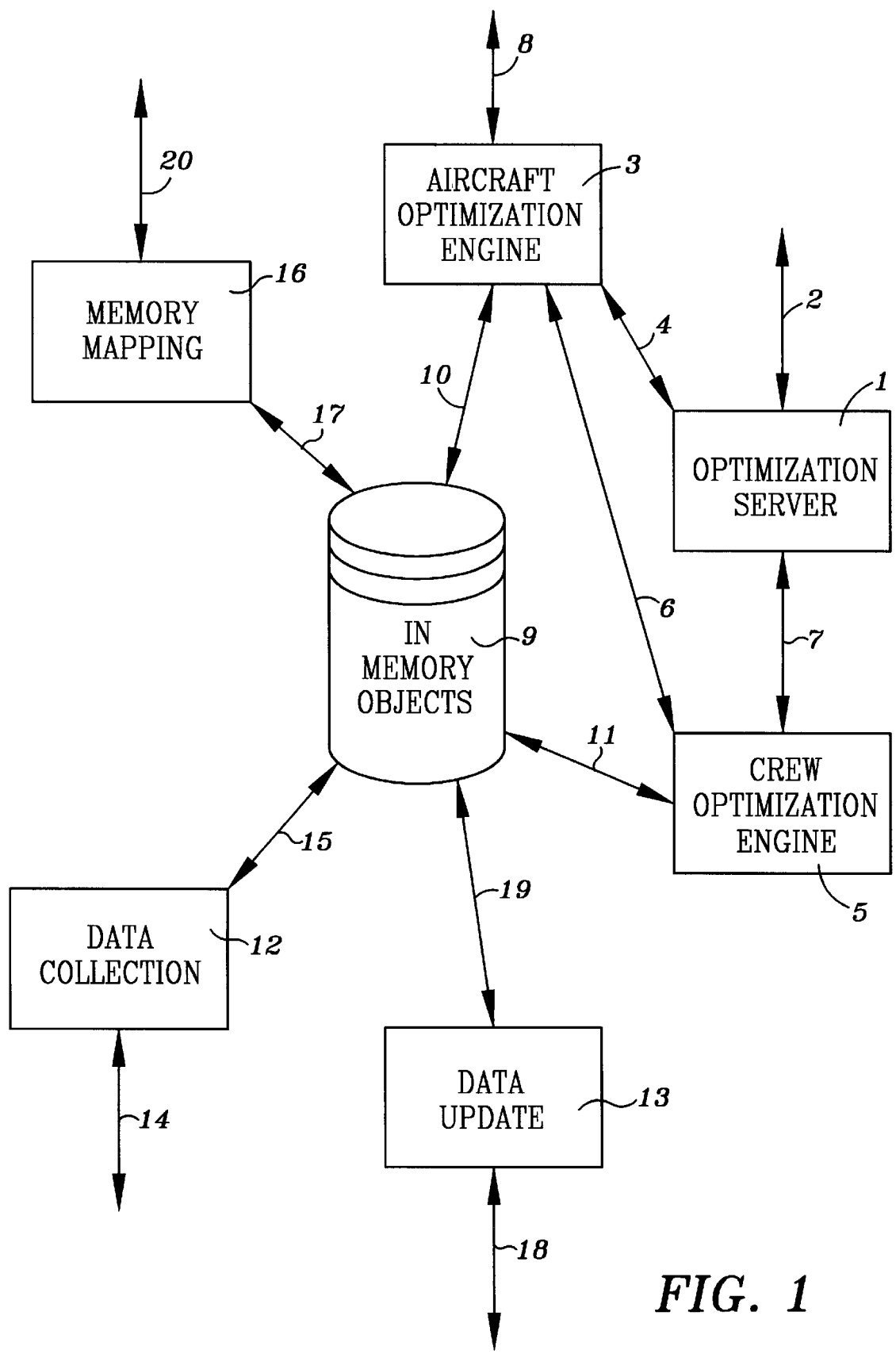
FIG. 1 is a functional block diagram of the environment in which the optimization engine of the present invention functions.

The following definitions, whether occurring with capitalizations or in lower case, are used consistently throughout this specification in disclosing the invention:
1. Neighborhood means a set of solutions derived through the combination of operations that may be performed on a Grounded Aircraft Route (as defined below).
2. Grounded Aircraft Route means the route of an aircraft grounded for a specific period of time.
3. Available Aircraft Route means the route of an aircraft that is available for use in a proposed solution to a flight schedule problem. That is, the set of grounded aircraft is a subset of the available aircraft set.
4. Phantom Route means a sequence of flights that are cancelled during solution generation. Due to the nature of the solution generation engine which sequentially repairs Grounded Aircraft Routes, some sequences of flights may be cancelled previous to the reparation of a particular Grounded Aircraft Route. Each such sequence will be associated as a Phantom Route. Phantom Routes make previously cancelled flights available for uncancellation operations.
5. There are three operations that are performed on one or more than one aircraft route:

A Unary Operation is an operation performed entirely on a Grounded Aircraft Route.

A Binary Operation is an operation performed on one Grounded Aircraft Route, and on one other Available Aircraft Route.

A Three-Way Operation is performed on one Grounded Aircraft Route, and on two other Available Aircraft Routes.
6. There are four Unary Operations which are used to do nothing, cancel, uncancel, and cancel and uncancel flights in a Grounded Aircraft Route. The cancel and uncancel combination implies that the sequence of flights removed from the route is replaced by the sequence of flights being uncancelled from a Phantom Route.

A Do-Nothing Operation is an identity operation which does not alter the Grounded Aircraft Route, and which is necessary for a Grounded Aircraft Route to exist in its own neighborhood.

A Cancel Operation is an operation which cancels a sequence of flights from a route.

An Uncancel Operation places a sequence of previously cancelled flights in a Phantom Route back into an aircraft route.
7. The following Binary Operations are used for repairing a Grounded Aircraft Route while maintaining the feasibility (to be defined below) of an Available Aircraft Route:

A Move Operation is comprised of the removal of a sequence of flights from one route, and the insertion of the sequence in another route.

A Swap Operation is comprised of the replacement of one sequence of flights in one route with another sequence of flights in another route. That is, the two identified flight sequences replace each other.

A Move And Cancel From Source Operation is comprised of the removal of a sequence of flights from one route, the insertion of part of the removed sequence into another route, and the cancellation of the remainder of the removed sequence.

A Move And Cancel From Target is comprised of the removal of a first sequence of flights from one route, the cancellation of a second sequence of flights from another route, and the replacement of the second sequence by the first sequence.

A Move And Cancel From Source And Target Operation is comprised of a cancellation of a first sequence of flights from a first route, a removal of a second sequence of flights from another route, replacement of the first sequence by part of the second sequence, and cancellation of the remainder of the second sequence.

A Move And Uncancel To Source Operation is comprised of a removal of a first sequence of flights from one route, replacement of the first sequence by a sequence of flights being uncancelled, and insertion of the first sequence into another route.

A Move And Uncancel To Target Operation is comprised of the removal of a first sequence of flights from one route, and the insertion of both the first sequence and a sequence of flights being uncancelled into another route.

A Swap and Cancel Operation is comprised of the removal of a first sequence of flights from one route, the removal of a second sequence of flights from another route, replacement of the first sequence with the second sequence, replacement of the second sequence by part of the first sequence, and cancellation of the remainder of the first sequence.

A Swap And Cancel From Source And Target is comprised of the removal of a first sequence of flights from one route, the removal of a second sequence of flights from another route, replacement of the first sequence by part of the second sequence, replacement of the second sequence by part of the first sequence, and cancellation of the remainders of the first and second sequences.

A Swap And Uncancel Operation is comprised of the removal of a first sequence of flights from one route, the removal of a second sequence of flights from a second route, the replacement of the first sequence with the second sequence, and the replacement of the second sequence with the first sequence and a sequence of flights being uncancelled.

8. A Three-Way Operation is comprised of the removal of a first sequence of flights from a Grounded Aircraft Route, the removal of a second sequence of flights from a first Available Aircraft Route, the removal of a third sequence of flights from a second Available Aircraft Route, the replacement of the first sequence with the second sequence, the replacement of the second sequence with the third sequence, and the replacement of the third sequence with the first sequence.

9. Cancelled Passenger is a passenger whose flight has been cancelled.

10. Displaced Passenger is a passenger who has no available flight on which to travel. A Displaced Passenger may be a Cancelled Passenger.

11. References to "feasible", "value", and "evaluate" are intended to mean that a solution is feasible if it does not violate operations constraints and user requirements. "Value" relates to the value determined by a marginal value calculator. "Evaluate" relates to the process of comparing alternative feasible solutions to select an optimal solution.

12. Ferry Flight refers to a flight that the optimization engine of the present invention creates to move an aircraft from one location to another.

13. The term "real time" is used in the sense that the optimization engine of the present invention creates multiple solutions to an operations problem in less than a minute, and usually in mere seconds.

14. In the descriptions which follow, the term "Source" refers to a Grounded Aircraft Route, and the term "Target" refers to an Available Aircraft Route.

15. A flight may be delayed implicitly through its position in a modified route. That is a flight will be delayed if the preceding flights in the route cause the associated aircraft to become available after the scheduled departure time for the flight.

Referring to FIG. 1, a functional block diagram of the environment in which the invention operates is shown, where a user interface referred to as an Optimization Server 1 is in electrical communication with a user by way of a bi-directional communication path 2, and receives a request for optimal solutions to a specific flight schedule disruption. In the preferred embodiment, the Optimization Server 1 is an HP K-570 running under the 11.x HPUS operating system. In response to the request, the Optimization Server 1 initializes an Aircraft Optimization Engine 3 by way of a bi-directional communication path 4, and provides the Aircraft Optimization Engine 3 an Aircraft Problem Specification. The Aircraft Optimization Engine 3 processes the Aircraft Problem Specification and generates a set of optimal solutions including aircraft reassignments and flight modifications to overcome the disruption. The solutions are transmitted over communication path 4, and through the Optimization Server 1 and bi-directional path 2 to the user.

The Aircraft Optimization Engine I in turn initializes a Crew Optimization Engine 5 by way of a bi-directional communication path 6 to determine whether the optimal flight solutions are efficiently supported by flight and service crews.

During operation, the Aircraft Optimization Engine 3 and the Crew Optimization Engine 5 communicate by way of bi-directional communication paths 10 and 11, respectively, with a memory system such as a disk storage unit 9 having stored therein memory objects which in the preferred embodiment are C++ objects containing all of the data used by the engines to solve problems. For example, the C++ objects include instances of Station, Market, Aircraft, Fleet, Subfleet, Maintenance, and Flight classes. The C++ objects in turn are created and updated by the Data Collection Unit 12 and the Data Update Unit 13, respectively.

More specifically, the Aircraft Optimization Engine requires data consisting of flight, station, aircraft, fleet, subfleet, and cost information. In particular, the flight data includes the scheduled departure and arrival times, the origin and destination stations, the assigned aircraft, the quantity of passengers, and the revenue for each specific flight. Stations contain the location, operating hours, and gate quantities for each station. Aircraft contain fleet and subfleet designations, seat capacities, and scheduled maintenance services for every aircraft. Fleets contain operational characteristics. Subfleets contain fleet designations and additional operational characteristics. The necessary cost information includes the cost corresponding to operating, delaying, canceling, and otherwise modifying flights and aircraft routes. In addition to this data, there exist associations amongst the data that are important for the engine to solve problems. In particular, the sequence of flights in a r route must be associated with an aircraft in order for an aircraft to possess a route. Other important associations are those that permit or restrict operations; these include the fleets and subfleets that may operate at a station, fleets that may operate between station pairs, and the substitutability of one fleet/subfleet for another. In general, all the data that describes the flight schedule, aircraft routes, cost factors, and any operational restrictions must be available to the solution engine. When a problem is defined, additional scenario data such as the identification of grounded aircraft, the grounding period for each grounded aircraft, the recovery period for the scenario, the ferry creation indicator, the identification of protected aircraft and flights, the maximum allowable flight delay length, and any other restrictions on solutions must be provided. Given this data, the engine is then capable of solving the irregular operations aircraft routing problem.

Continuing with the description of FIG. 1, the Data Collection Unit 12 receives complete information for stations, markets, aircraft, fleets, subfleets, maintenance, and flights from the user by way of bi-directional communication path 14. Thereafter, the Data Collection Unit 12 creates C++ objects which are supplied by way of a bi-directional communication path 15 for storage in the disk storage unit 9, and at memory locations specified by a Memory Mapping Unit 16 along a bi-directional communication path 17. Further, the Data Update Unit 13 receives revisions to the C++ objects from the user over a bi-directional communication path 18, and supplies corrections through a bi-directional communication path 19 to the objects identified by the Memory Mapping Unit 16.

The Memory Mapping Unit 16 receives control signals from the user over a bi-directional communication path 20, and in response thereto identifies the addresses of the C++ objects in the disk storage unit 9 which are being operated upon. By means of the Memory Mapping Unit 16 and the Data Update Unit 13, the user is able to keep the data stored in the Disk Storage Unit 9 current with the data being supplied to the user by way of communication path 2.

Thus, at any given time, the C++ objects of the Disk Storage Unit 9 reflect the existing flight environment, including identifications of protected flights which are not to be cancelled or delayed; flight sequences or routes for each aircraft; the stations or airports to be used by the aircraft; the fleets and subfleets assigned to each station; station closure times; fleet arrival and departure curfews; inviolable and violable maintenance schedules; aircraft seat capacities; fleet operational ground times; operations costs; flight disruption costs; subfleet disruption costs; and revenue and passenger information for each scheduled flight.

It is to be understood that the aircraft optimization engine 3, the optimization server 1, and the crew optimization engine 5 may each be a microprocessor.

The Aircraft Problem Specification received by the Aircraft Optimization Engine 3 upon being initialized by a request from the user, further includes the identification of grounded aircraft; the stations where aircraft groundings have occurred; the start and end times of each of such groundings; the identification of available aircraft; the identification of protected flights; recovery period start and end times; maximum allowable flight delays; and flight cancellation and ferry creation restraints.

Based upon the above information a solution comprised of flight delays and cancellations, Ferry Flight creations, as well as aircraft reassignments is produced within the following operations constraints:

i. No flights originally departing outside of the recovery period may be modified;

ii. No delayed flights may depart after the recovery period;

iii. The length of every flight delay may not exceed the maximum flight delay length;

iv. Cancel protected flights may not be cancelled;

v. Delay protected flights may not be delayed;

vi. Flight cancellations are permitted only if a flight cancellation indicator is set to true;

vii. Ferry Flight creations are permitted only if a ferry creation indicator is set to true;

viii. Aircraft route modifications may be made only to grounded and available aircraft;

ix. Aircraft route modifications may not violate station closure times, fleet-related arrival or departure curfews, or other fleet restrictions;

x. Aircraft route modifications may not violate restrictions on subfleets which may fly between stations;

xi. Aircraft route modifications may not violate inviolable scheduled maintenance services; and xii. The first flight after the recovery period in a modified aircraft route must be of the aircraft fleet scheduled for that route.

Figure 2:
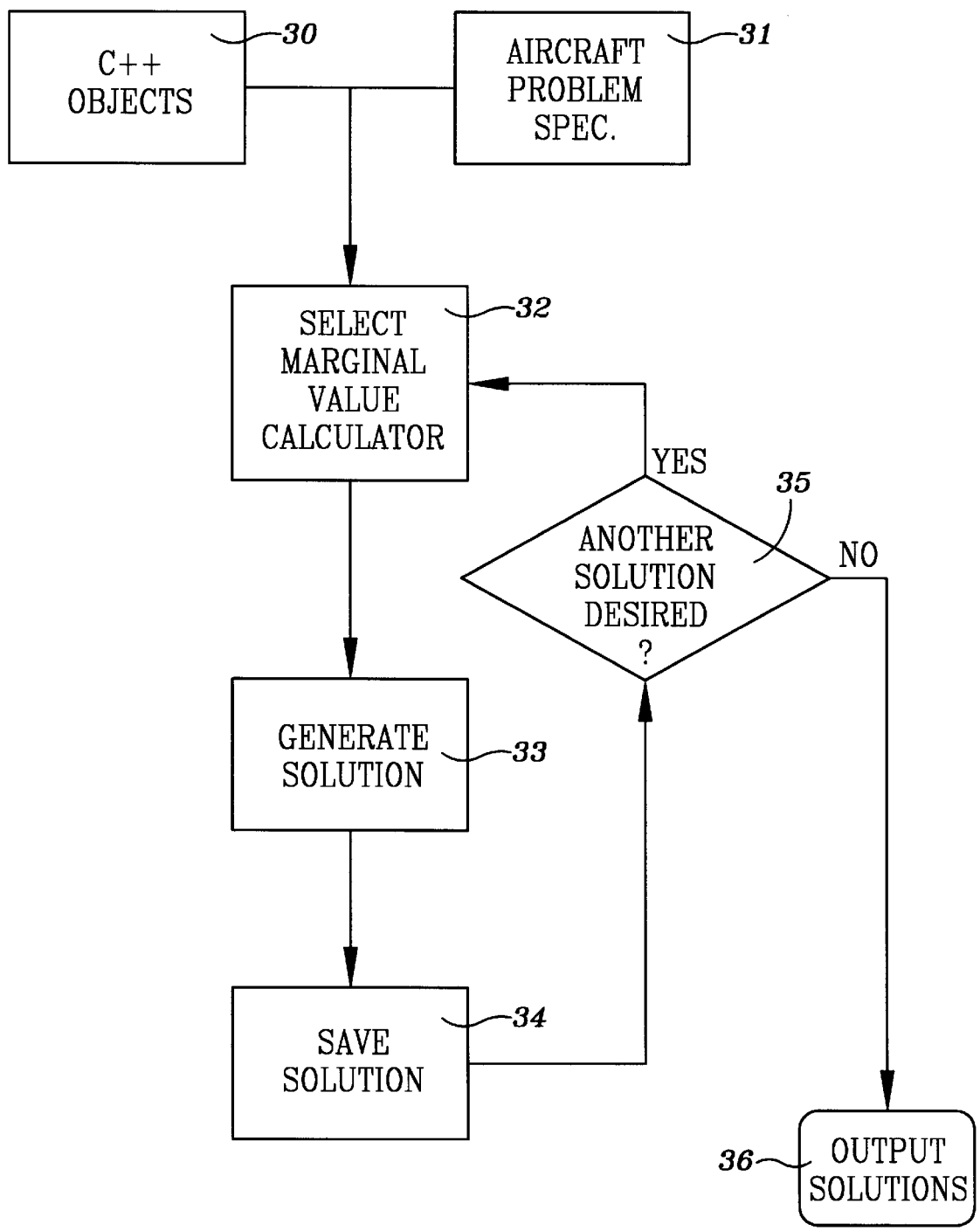
FIG. 2 is a functional block diagram of the optimization engine of the present invention.

Referring to FIG. 2, a top level logic flow diagram of the process performed by the Aircraft Optimization Engine 3 of FIG. 1 in generating a set of solutions for a flight schedule problem is illustrated. Briefly, the Aircraft Optimization Engine 3 accesses the C++ objects 30 of FIG. 2 which are stored in a memory system such as the Disk Storage Unit 9 of FIG. 1, and the information comprising the Aircraft Problem Specification 31 of FIG. 2 from the Optimization Server 1 of FIG. 1. Based upon this information, the Aircraft Optimization Engine selects one of plural marginal value calculators at logic step 32 of FIG. 2 which will produce a "feasible solution", e.g., one which does not violate the user requirements and operations constraints placed on the solution process.

The marginal value calculators are comprised of solution attributes which are prioritized and weighted according to user desires. Thus, any solution which is generated must not only comply with the operations constraints described above, but also the weighted and prioritized attributes desired by the user (user requirements). From logic step 32, the logic flow process proceeds to logic step 33 where a solution is generated, and then to logic step 34 where the solution is saved.

The logic flow process moves from logic step 34 to logic step 35, where a decision is made whether to generate further solutions. If no further solutions are to be generated, the logic flow process moves to logic step 36 where the generated solutions are transferred to the Optimization Server 1 of FIG. 1, and then the process terminates. If another solution is desired, however, the logic flow process continues from logic step 35 of FIG. 2 to logic step 32 where the process proceeds as before described.

Figure 3:
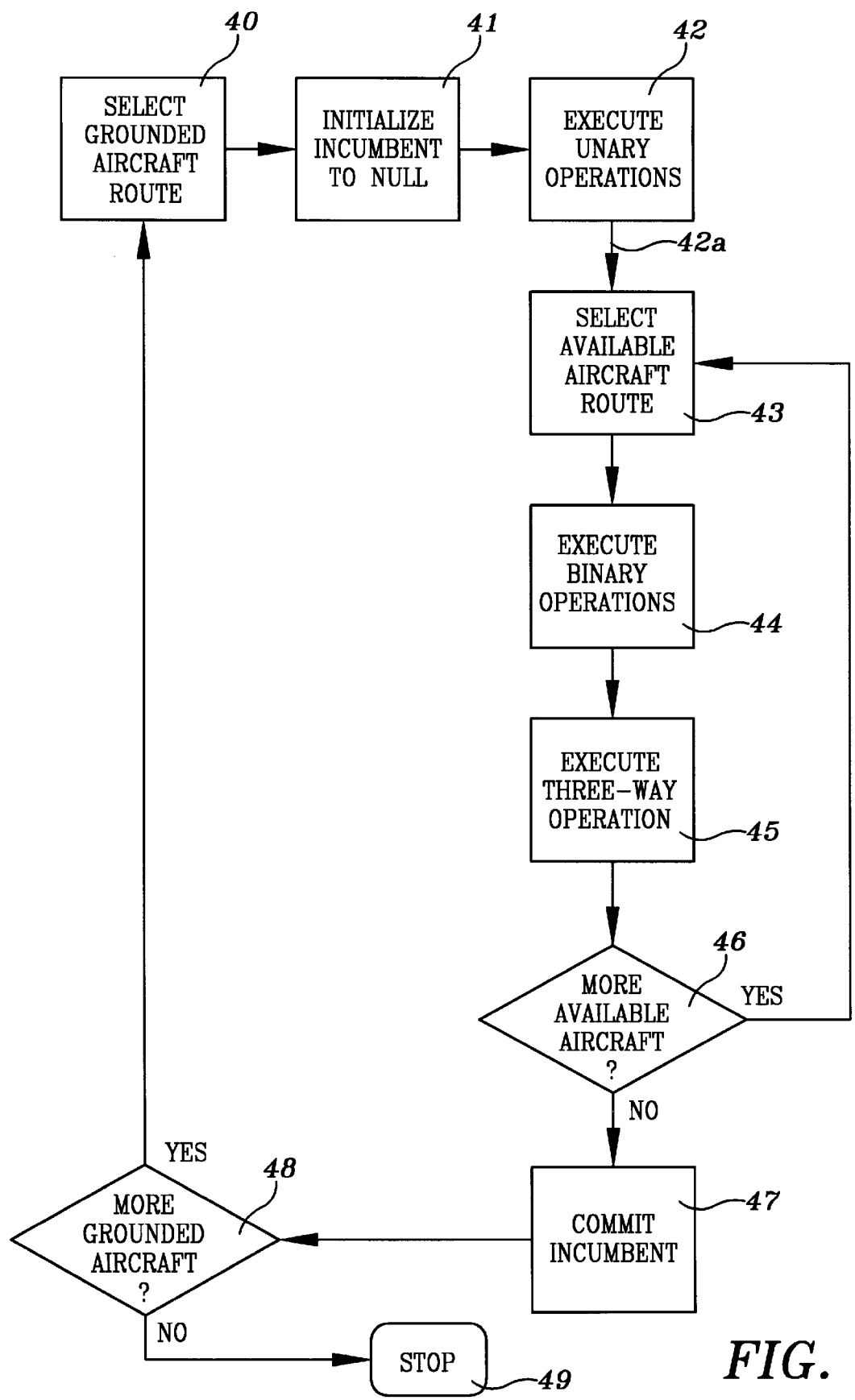
FIG. 3 is a logic flow diagram of the operation of the optimization engine of the present invention.

Referring to FIG. 3, the logic step 33 of FIG. 2 is illustrated in more detail. At logic step 40 of FIG. 3, a Grounded Aircraft Route is selected from the Aircraft Problem Specification, and then at logic step 41 an incumbent solution which represents the current best repair of the Grounded Aircraft Route is set to null.

It is to be understood that an incumbent solution comprised of a first data set of at least one of a modified grounded aircraft route, a modified available aircraft route, a modified third available aircraft route, phantom routes, and modified phantom routes, is replaced when another candidate solution has a data set marginal value calculated by the marginal value calculator which exceeds the data set marginal value of the incumbent solution.

Continuing with the description of FIG. 3, at logic step 42, the Unary Operations are applied to the Grounded Aircraft Route, and at logic step 43, another Available Aircraft Route is selected.

From logic step 43, the logic flow process continues to logic step 44 where the Binary Operations are applied to the Grounded Aircraft Route selected at logic step 40 and to the Available Aircraft Route selected at logic step 43. The logic flow process then proceeds from logic step 44 to logic step 45, where a Three-Way Operation is applied to the Grounded Aircraft Route, the second Available Aircraft Route selected at logic step 43, and to a third Available Aircraft Route which is selected at logic step 45. Thereafter, the logic flow process moves to logic step 46 where a determination is made whether additional aircraft are available for Binary Operation execution. If so, the logic flow process proceeds to logic step 43 to continue as before described. Thus, it may be seen that for every second available aircraft selected at logic step 43, all other available aircraft are tested as the third available aircraft within logic step 45 to operate on flight segments of all available aircraft in seeking a solution.

If an additional available aircraft route is not available at logic step 46, the logic flow process continues from logic step 46 to logic step 47, where the incumbent reparation for the Grounded Aircraft Route generated by the preceding process is committed towards the solution. From logic step 47, the logic flow process proceeds to logic step 48, where a determination is made whether additional Grounded Aircraft Routes exist. If not, the logic flow process is terminated at logic step 49 (where the composition of the committed Grounded Aircraft Route reparations serves as the solution), and jumps to logic step 34 of FIG. 2. If additional grounded aircraft routes exist, however, the logic flow process moves from logic step 48 to logic step 40 to continue as before described.

Figure 4:
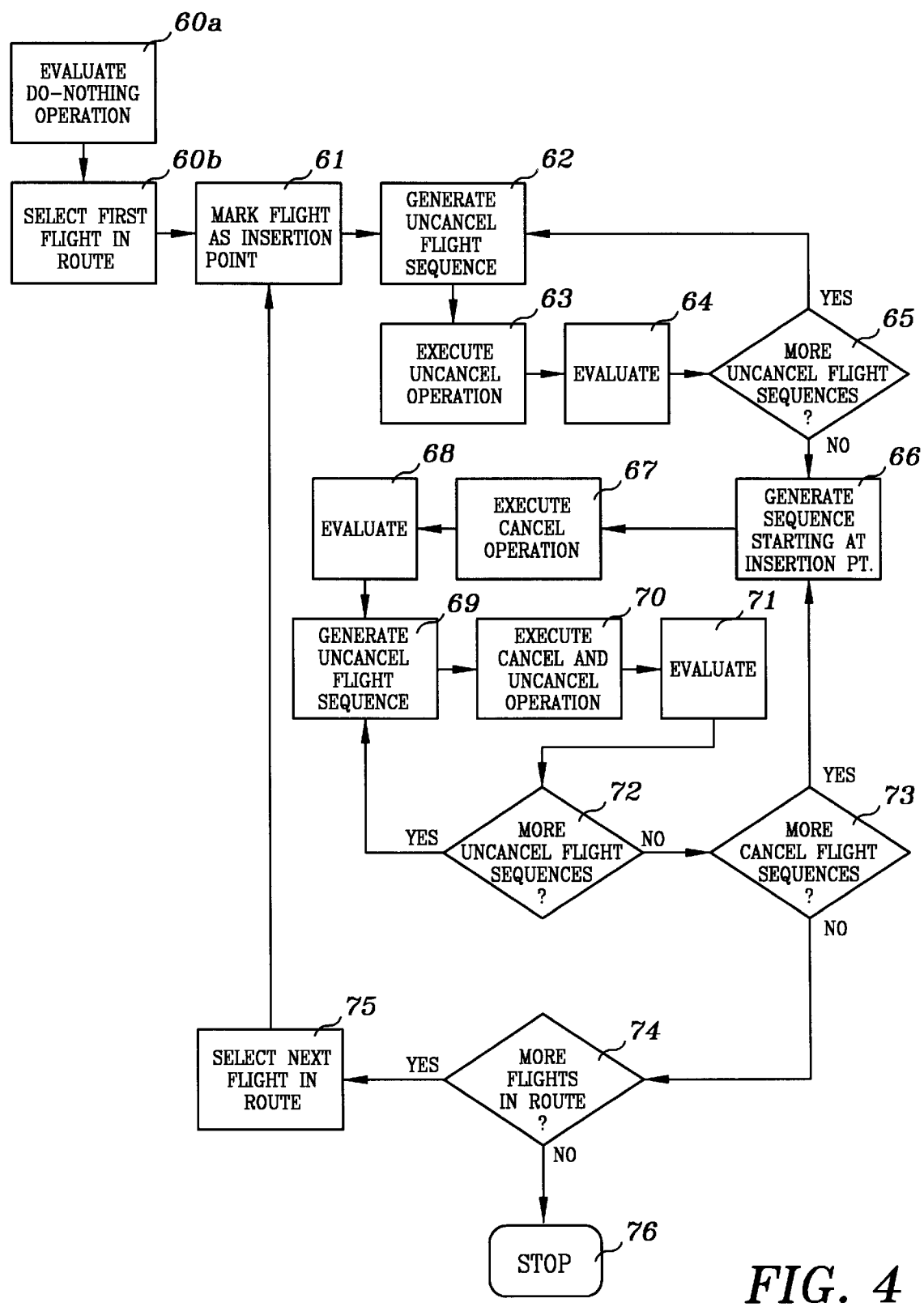
FIG. 4 is a logic flow diagram of the operation of the invention in executing Unary Operations.

Referring to FIG. 4, the Unary Operations performed by the Aircraft Optimization Engine of the present invention are illustrated in logic flow diagram form. Given for the Unary Operations is the Grounded Aircraft Route selected at logic step 40 from FIG. 3. At logic step 60$a$ of FIG. 4, evaluate the result of the do-nothing operation. That is an evaluation of the Grounded Aircraft Route without modification is made to determine if it is feasible with respect to the operations constraints and user requirements, and if so, to calculate its marginal value and make it the incumbent. It may be made the incumbent because until this point, the incumbent is null. From logic step 60$a$, the logic flow process proceeds to logic step 60$b$. At logic step 60$b$ of FIG. 4, the first flight leg in the input Grounded Aircraft Route is selected, and thereafter at logic step 61 the selected flight leg is designated as the insertion point for application of the Unary Operations. From logic step 61, the logic flow process proceeds to logic step 62 where an uncancel flight sequence is generated. That is, in the case where more than one Grounded Aircraft Route exists, flights may be cancelled while repairing another Grounded Aircraft Route which may be used in repairing the Grounded Aircraft Route under consideration. Thus, flights previously cancelled will exist in Phantom Routes which are then used to generate uncancel flight sequences. The generation of uncancel flight sequences requires inspection of all flight sequences in all Phantom Routes.

From logic step 62, the logic flow process continues to logic step 63 to execute an Uncancel Operation to place a previously cancelled sequence of flights back into the Grounded Aircraft Route that is being formed as a solution. The logic flow process then moves from logic step 63 to logic step 64, where an evaluation is made to determine whether the resultant Grounded Aircraft Route is feasible with respect to the operations constraints and user requirements, and if so, to calculate its value. In general, the evaluation step checks that the Grounded Aircraft Routes, Available Aircraft Routes, and Phantom Routes resulting from the execution of any operations do not violate any of the operations constraints or user requirements. Furthermore, if feasibility is verified, then the marginal value of the result is calculated, and the result replaces the incumbent if its marginal value exceeds that of the incumbent. Thereafter, at logic step 65, if not all uncancel sequences have been generated, then the logic flow process continues from logic step 65 to logic step 62 to proceed as before described. If at logic step 65 it is established that all uncancel sequences have been generated, the logic flow process proceeds from logic step 65 to logic step 66 to generate a flight sequence for cancellation from the Grounded Aircraft Route. The flight sequence must begin at the insertion point established at logic step 61.

From logic step 66, the logic flow process proceeds to logic step 67 where the flight sequence of logic step 66 is cancelled from the Grounded Aircraft Route under consideration. Thereafter, at logic step 68 the results of the cancellation undergoes an evaluation as described above. The logic flow process then continues from logic step 68 to logic step 69 where the uncancel flight sequence generation performed at logic step 62 is repeated, and then proceeds to logic step 70 where a Cancel And Uncancel Operation is applied to the Grounded Aircraft Route. That is, the flight sequence generated in logic step 66 is replaced in the Grounded Aircraft Route with the uncancel flight sequence generated in logic step 69. Additionally, the cancel flight sequence removed from the Grounded Aircraft Route becomes a new Phantom Route. However, this Phantom Route will not be available for uncancellations until it is committed as part of the reparation for the Grounded Aircraft Route under consideration.

The logic flow process then proceeds from logic step 70 to logic step 71 where the results of the operation of logic step 70 undergoes an evaluation. Thereafter, at logic step 72 a determination is made whether all uncancel flight sequences have been generated. If not, then the logic flow process loops back from logic step 72 to logic step 69 to continue as before described. If all uncancel flight sequences have been generated, however, the logic flow process continues from logic step 72 to logic step 73, where a determination is made whether all cancel flight sequences starting at the insertion point designated at logic step 61 have been generated. If not, the logic flow process moves from logic step 73 to logic step 66 to continue as before described. If so, the logic flow process moves from logic step 73 to logic step 74 to determine whether there are any more flights in the grounded route under consideration. If so, the logic flow process continues to logic step 75 to select the next flight in the route, and then transfers to logic step 61 to continue as before described.

If there are no further flights in the route under consideration, the logic flow process moves from logic step 74 to logic step 76 where the logic flow process for Unary Operations is terminated, and thereafter proceeds along logic path 42$a$ of FIG. 3.

Figure 5:
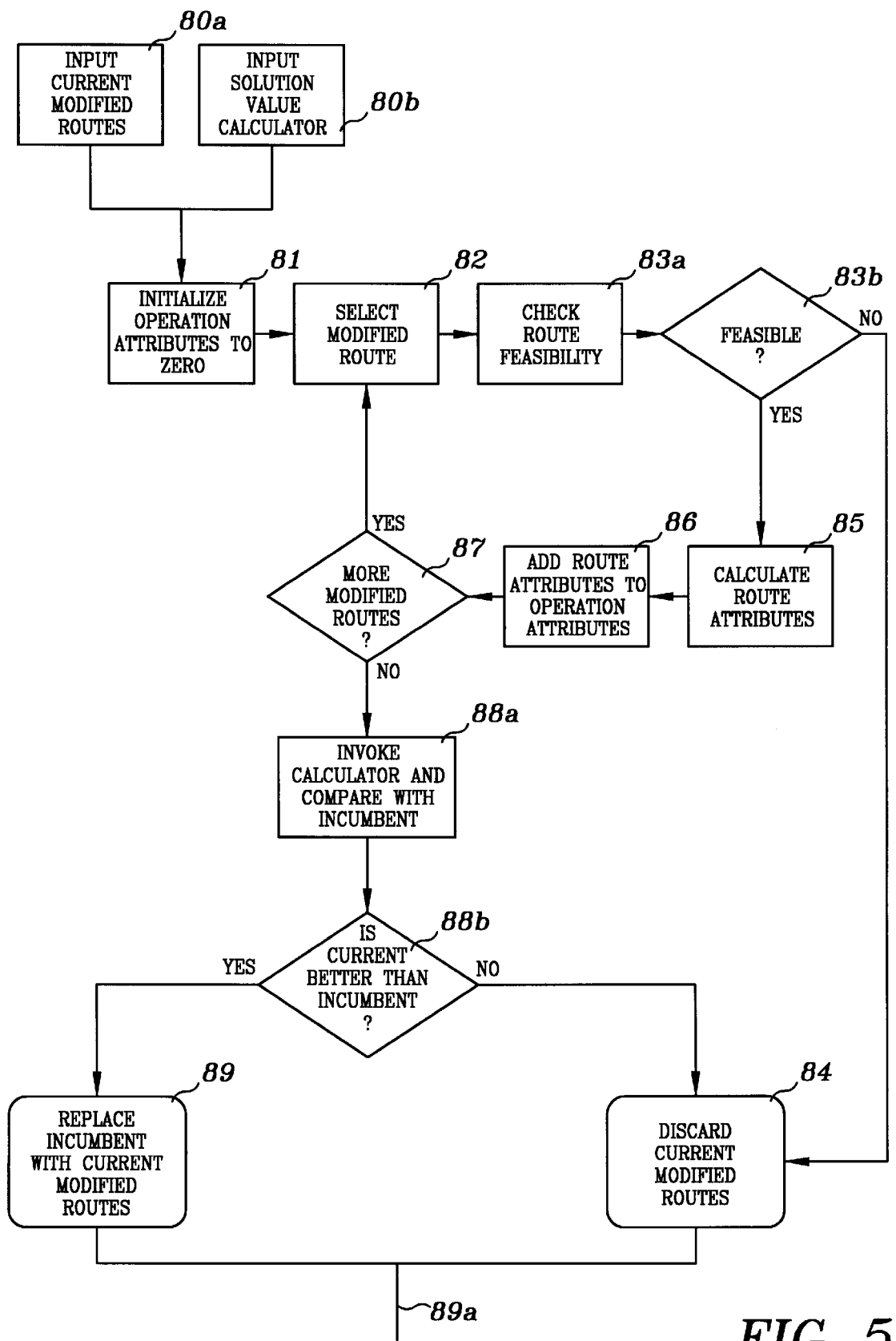
FIG. 5 is a logic flow diagram of the operation of the invention in executing the evaluation logic steps 64, 68, and 71 of FIG. 4.

Referring to FIG. 5, an evaluation as represented by logic steps 64, 68, and 71 of FIG. 4, is illustrated in more detail by a logic flow diagram. The logic flow process receives the Grounded Aircraft Route, and any Available Aircraft Routes and Phantom Routes, as currently modified at logic step 80$a$. The logic flow process further receives a selected marginal value calculator at logic step 80$b$. At logic step 81, the values for the relevant attributes in the marginal value calculator are set to zero. The values of these attributes will be used by the marginal value calculator to determine the value of the input modified routes. At logic step 82 a modified route is selected. This selection process should begin with the modified grounded route, continue with each modified available route, and conclude with each modified or new phantom route. From logic step 82, the logic flow process moves to logic step 83$a$ where the selected modified route is checked against operations constraints and user requirements, and at logic step 83$b$ a determination is made whether the selected modified route is feasible. If not, the current modified routes are discarded at logic step 84. If the route as currently modified is feasible, however, the logic flow process continues from logic step 83$b$ to logic step 85 where the route attributes' values such as the quantity of delayed flights, delayed passengers, delayed minutes, cancelled flights, cancelled passengers, etc., are calculated.

From logic step 85, the logic flow process moves to logic step 86 to increment the attribute values in the marginal value calculator by the values obtained in logic step 85. From logic step 86, the logic flow process continues to logic step 87 to determine whether unevaluated input modified routes remain. If so, the logic flow process proceeds from logic step 87 to logic step 82 to continue as before described. If all modified routes have been evaluated, however, the logic flow process continues from logic step 87 to logic step 88$a$ to calculate the marginal value of the set of current modified routes, and compare the result with the marginal value of the incumbent set of modified routes. Thereafter, the logic flow process proceeds from logic step 88*a* to logic step 88*b* to determine whether the marginal value of the current modified routes is better than that of the incumbent routes. The input marginal value calculator determines which of the two, the current or the incumbent, is better based on its attribute settings. If the current is better than the incumbent, the incumbent routes are replaced by the current set of modified routes at logic step 89. If the current is not better than the incumbent, the logic flow process jumps from logic step 88*b* to logic step 84 to discard the current modified routes.

From either logic step 84 or logic step 89, the logic flow process proceeds along logic path 89*a* to reenter the logic flow path from which an evaluation was required.

Figure 6A:
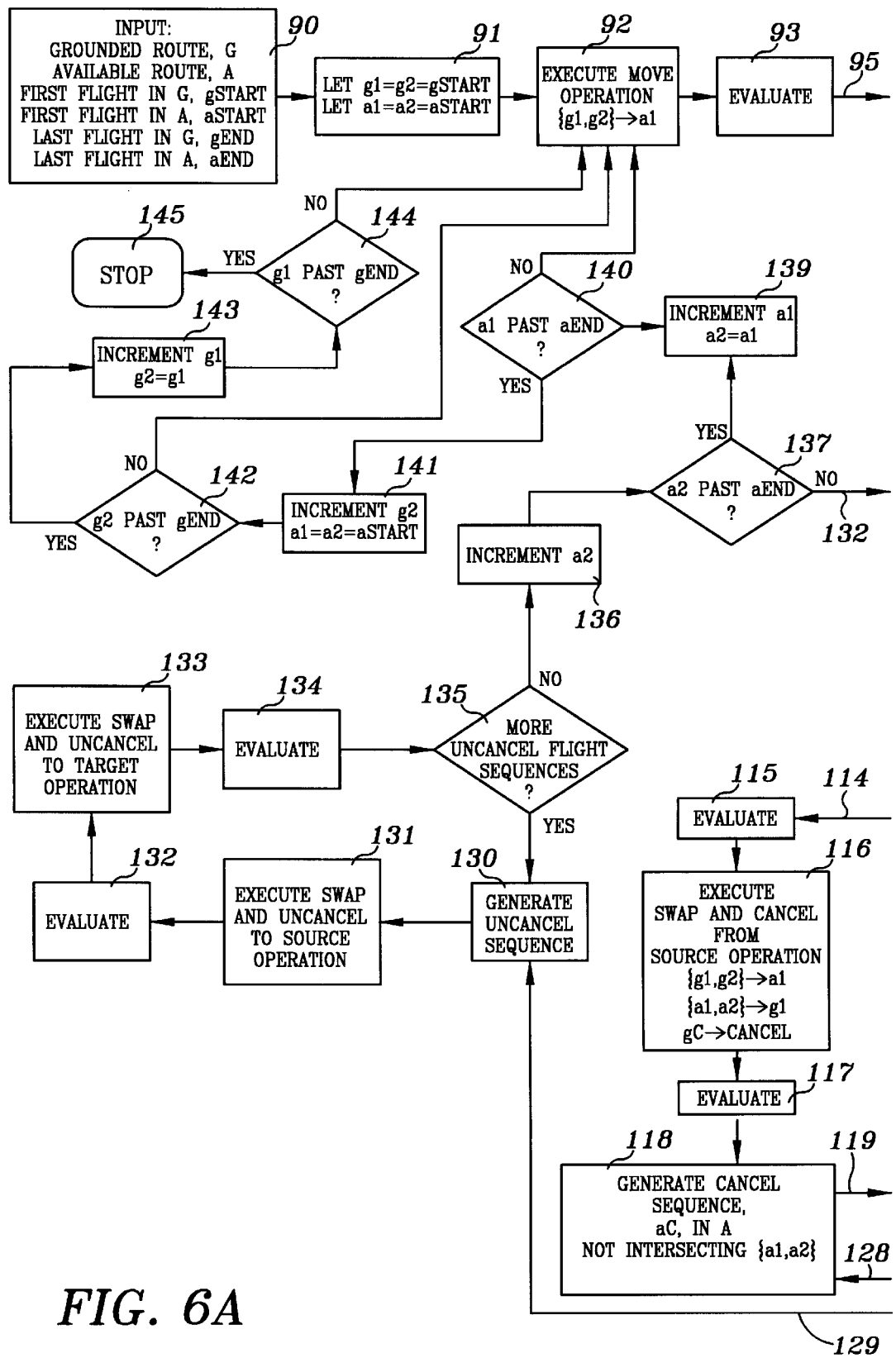
FIGS. 6A and 6B are logic flow diagrams of the operation of the invention in executing Binary Operations.
Figure 6B:
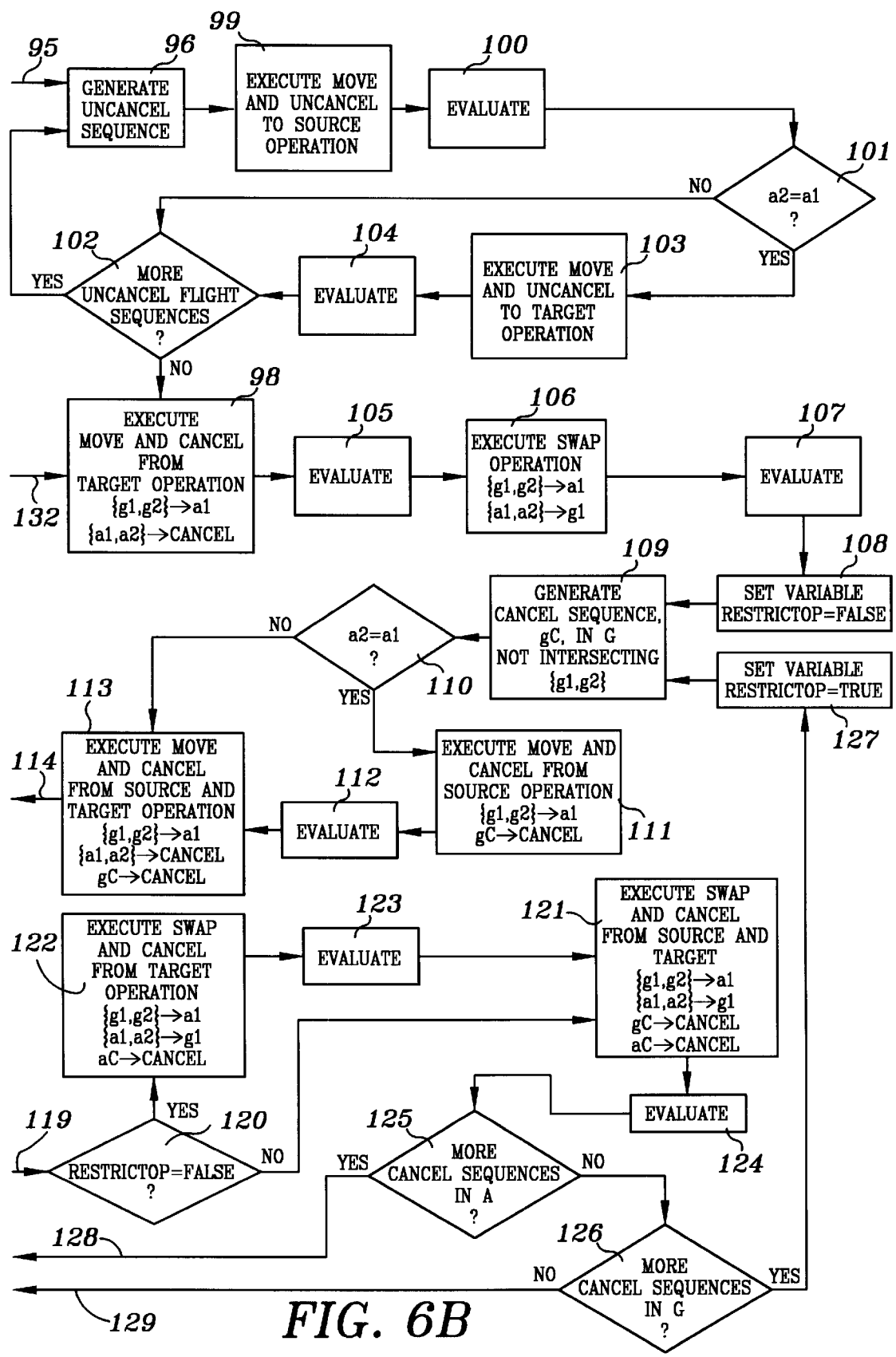

Referring to FIGS. 6A and 6B, the logic steps performed by the Aircraft Optimization Engine 3 of FIG. 1 in executing Binary Operations is illustrated. More particularly, at logic step 90 of FIG. 6A a Grounded Aircraft Route G and an Available Aircraft Route A are identified. In addition, the first flight leg of the Grounded Aircraft Route is identified as gSTART, and the first flight leg of the Available Aircraft Route is identified as aSTART. In like manner, the last flight leg of the Grounded Aircraft Route is identified as gEND, and the last flight leg of the Available Aircraft Route is identified as aEND.

From logic step 90 of FIG. 6A, the logic flow process continues to logic step 91 where pointers g1 and g2 are pointed to gSTART, and pointers a1 and a2 are pointed to aSTART. Thereafter, at logic step 92, the sequence of flight legs of the Grounded Aircraft Route designated by pointers g1,g2 is removed from the Grounded Aircraft Route and inserted into the Available Aircraft Route at the flight leg pointed to by a1. This move is evaluated at logic step 93 according to the logic flow depicted in FIG. 5. From logic step 93, the logic flow process proceeds along logic path 95 to logic step 96 of FIG. 6B where an uncancel flight sequence is generated as in logic flow steps 62 and 69 depicted in FIG. 4. Thereafter at logic step 99 of FIG. 6B, the Move and Uncancel to Source Operation is executed. That is, the sequence of flights designated by g1,g2 in G is replaced by the uncancel sequence generated in logic step 96, and g1,g2 is inserted into A at a1. From logic step 99, the logic flow process proceeds to logic step 100 where the results of the Move And Uncancel To Source Operation are evaluated as depicted in FIG. 5.

Thereafter, at logic step 101 of FIG. 6B a decision is made whether the pointers a1 and a2 are designating the same flight leg. If not, the logic flow process branches to logic step 102. If, however, the pointers a1 and a2 are designating the same flight leg, the logic flow process continues from logic step 101 to logic step 103, where the Move And Uncancel To Target Operation is executed. As a result, the sequence of flights designated by g1,g2 is removed from G and inserted along with the uncancel sequence generated in logic step 96 into A at a1. From logic step 103, the logic flow process proceeds to logic step 104 where the results of the Move And Uncancel To Target Operation are evaluated as depicted in FIG. 5.

At logic step 102 of FIG. 6B, if not all uncancel sequences have been generated, then the logic flow process continues from logic step 102 to logic step 96 to proceed as before described. If at logic step 102 it is established that all uncancel sequences have been generated, the logic flow process proceeds from logic step 102 to logic step 98. At logic step 98, the logic flow process executes a Move And Cancel From Target Operation, in which g1,g2 is removed from G; a1,a2 is replaced by g1,g2 in A; and a1,a2 is cancelled to thereby become a new Phantom Route. From logic step 98, the logic flow process proceeds to logic step 105 where the results of the Move And Cancel From Target Operation are evaluated as depicted in FIG. 5. From logic step 105 of FIG. 6B, the logic flow process continues to logic step 106 where a Swap Operation is executed. That is, g1,g2 is replaced in G by a1,a2; and a1,a2 is replaced in A by g1,g2. The results of the Swap Operation then are evaluated at logic step 107 as depicted in FIG. 5 and a RestrictOp flag is set false at logic step 108 of FIG. 6B.

The logic flow process next moves from logic step 108 to logic step 109, where a flight sequence, gC, in the Grounded Aircraft Route which does not intersect the flight sequence currently indicated by the pointers g1,g2 is generated. Thereafter, at logic step 110 a determination is made whether the pointer a1 points to the same flight leg of the Available Aircraft Route as the pointer a2. If so, the logic flow process branches from logic step 110 to logic step 111 where a Move And Cancel From Source Operation is executed. That is, the flight sequences g1,g2 and gC are removed from G while g1,g2 is inserted into A at a1, and gC is cancelled to thereby become a new Phantom Route. The results of the operation at logic step 111 are thereafter evaluated at logic step 112 in accordance with the logic flow of FIG. 5, and the logic flow process of FIG. 6B next moves to logic step 113.

If at logic step 110 the pointers a1 and a2 are not designating the same flight leg, the logic flow process proceeds from logic step 110 to logic step 113, where a Move And Cancel From Source And Target Operation is executed. That is, the flight sequences g1,g2 and gC are removed from G, while g1,g2 replaces a1,a2 in A, and gC and a1,a2 are cancelled to thereby become a new Phantom Routes. From logic step 113, the logic flow process proceeds by way of logic path 114 to logic step 115 of FIG. 6A, where the results of the operation executed at logic step 113 are evaluated as in FIG. 5. Thereafter, the logic flow process proceeds to logic step 116 of FIG. 6A to execute a Swap And Cancel From Source Operation. More particularly, the flight sequence gC is removed from G; g1,g2 is replaced in G by a1,a2; a1,a2 is replaced in A by g1,g2; and gC is cancelled to thereby become a new Phantom Route. The results of the operation at logic step 116 are thereafter evaluated at logic step 117 in accordance with the logic flow of FIG. 5, and the logic flow process of FIG. 6A next moves to logic step 118.

At logic step 118 a flight sequence, aC, in the Available Aircraft Route is generated which does not intersect the flight sequence indicated by pointers a1,a2. From logic step 118, the logic flow process next moves along logic path 119 to logic step 120 of FIG. 6B. At logic step 120, the RestrictOp flag is sensed. If the flag is set true, the logic flow process proceeds from logic step 120 to logic step 121, where a Swap And Cancel From Source And Target Operation is executed. That is, the flight sequence gC is removed from G; aC is removed from A; g1,g2 is replaced in G by a1,a2; a1,a2 is replaced in A by g1,g2; and gC and aC are cancelled to thereby become new Phantom Routes.

If the RestrictOp flag at logic step 120 is found to be set false, the logic flow process branches from logic step 120 to logic step 122 where a Swap And Cancel From Target Operation is executed. The flight sequence aC is removed from A; g1,g2 is replaced in G by a1,a2; a1,a2 is replaced in A by g1,g2; and aC is cancelled to thereby become a new Phantom Route. The results of the operation at logic step 122 are thereafter evaluated at logic step 123 in accordance with the logic flow of FIG. 5. The logic flow process of FIG. 6B then proceeds to logic step 121, where the process continues as before described.

The results of the operation at logic step 121 are thereafter evaluated at logic step 124 in accordance with the logic flow of FIG. 5. The logic flow process then proceeds to logic step 125 of FIG. 6B to determine whether additional cancel flight sequences exist in the Available Aircraft Route. That is, there may be additional cancel flight sequences in the Available Aircraft Route that do not intersect the flight sequence indicated by a1,a2. If no additional cancel flight sequences exist at logic step 125, the logic flow process continues from logic step 125 to logic step 126 to determine whether any additional cancel flight sequences exist in the Grounded Aircraft Route that do not intersect the flight sequence indicated by g1,g2. If yes, the RestrictOp flag is set true at logic step 127, and the logic flow process continues to logic step 109 to proceed as before described.

If additional cancel flight sequences exist in the Available Aircraft Route as determined at logic step 125, the logic flow process moves along logic path 128 to logic step 118 of FIG. 6A to continue as before described. Further, if no additional cancel flight sequences exist in the Grounded Flight Route, the logic flow process proceeds from logic step 126 along logic flow path 129 to logic step 130, where an uncancel flight sequence is generated as in logic flow step 96 of FIG. 6B and logic flow steps 62 and 69 depicted in FIG. 4. From logic step 130 of FIG. 6B, the logic flow process continues to logic step 131 where a Swap And Uncancel To Source Operation is executed. More particularly, the uncancel flight sequence generated in logic step 130 and a1,a2 replace g1,g2 in G, and g1,g2 replaces a1,a2 in A.

From logic step 131, the logic flow process continues to logic step 132 to evaluate the logic operation executed at logic step 131 in accordance with the logic process of FIG. 5, and then proceeds to logic step 133 of FIG. 6A where a Swap And Uncancel To Target Operation is executed. The uncancel flight sequence generated in logic step 130 and g1,g2 replace a1,a2 in A, and a1,a2 replaces g1,g2 in G.

The logic flow process proceeds from logic step 133 to logic step 134 of FIG. 6A to evaluate the operation executed at logic step 133 in accordance with the logic process of FIG. 5, and thereafter continues to logic step 135 to determine whether all uncancel sequences have been generated. If not, the logic flow process branches to logic step 130 to continue as before described. If so, the logic flow process proceeds from logic step 135 to logic step 136 where the pointer a2 is incremented by one. Thereafter, the logic flow process continues to logic step 137, where a determination is made whether a2 has been incremented past aEND. If not, the logic flow process moves along logic path 138 to logic step 98 of FIG. 6B to continue as before described. If a2 has been incremented beyond aEND, however, the logic flow process proceeds from logic step 137 to logic step 139 of FIG. 6A where a1 is incremented by one and a2 is made equal to a1. Thereafter, the logic flow process continues from logic step 139 to logic step 140 to determine whether a1 has been incremented past aEND. If not, the logic flow process proceeds from logic step 140 to logic step 92 to continue as before described.

If a1 has been incremented past aEND at logic step 140, however, the logic flow process proceeds to logic step 141, where g2 is incremented by one, and a1 and a2 are set equal to aSTART. Thereafter, the logic flow process continues from logic step 141 to logic step 142 to test g2. If g2 has not been incremented past gEND, the logic flow process proceeds to logic step 92 to continue as before described. If at logic step 142, it is determined that g2 has been incremented past gEND, the logic flow process proceeds to logic step 143 to increment g1 by one and set g2 equal to g1 . Thereafter, g1 is tested at logic step 144 to determine whether g1 has been incremented past gEND. If not, the logic flow process proceeds to logic step 92 to continue as before described. If g1 has been incremented past gEND, however, the logic flow process continues from logic step 144 to logic step 145 where the logic flow process for Binary Operations is terminated.

Figure 7A:
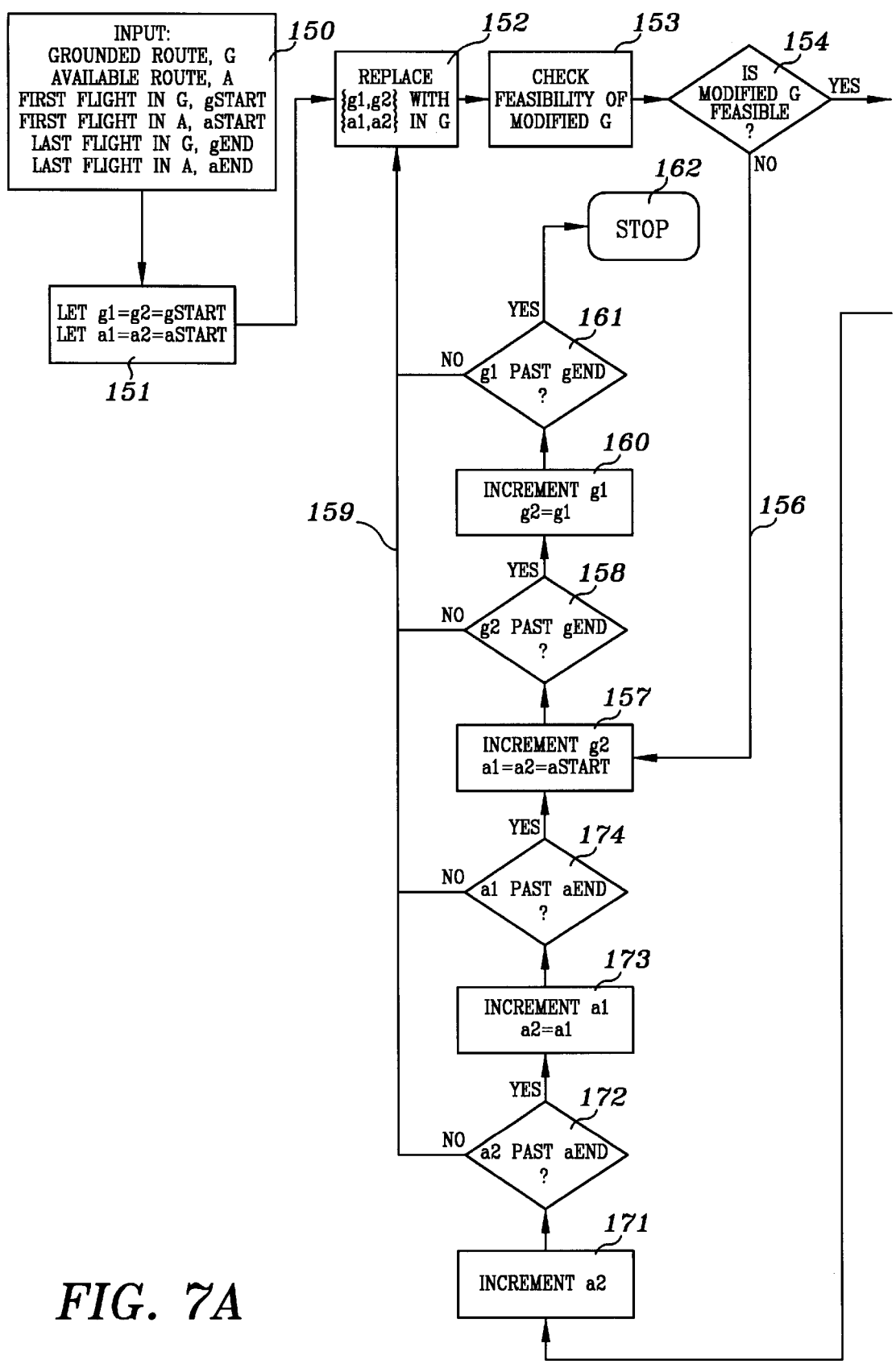
FIGS. 7A–7B are logic flow diagrams of the operation of the invention in executing Three-Way Operations.
Figure 7B:
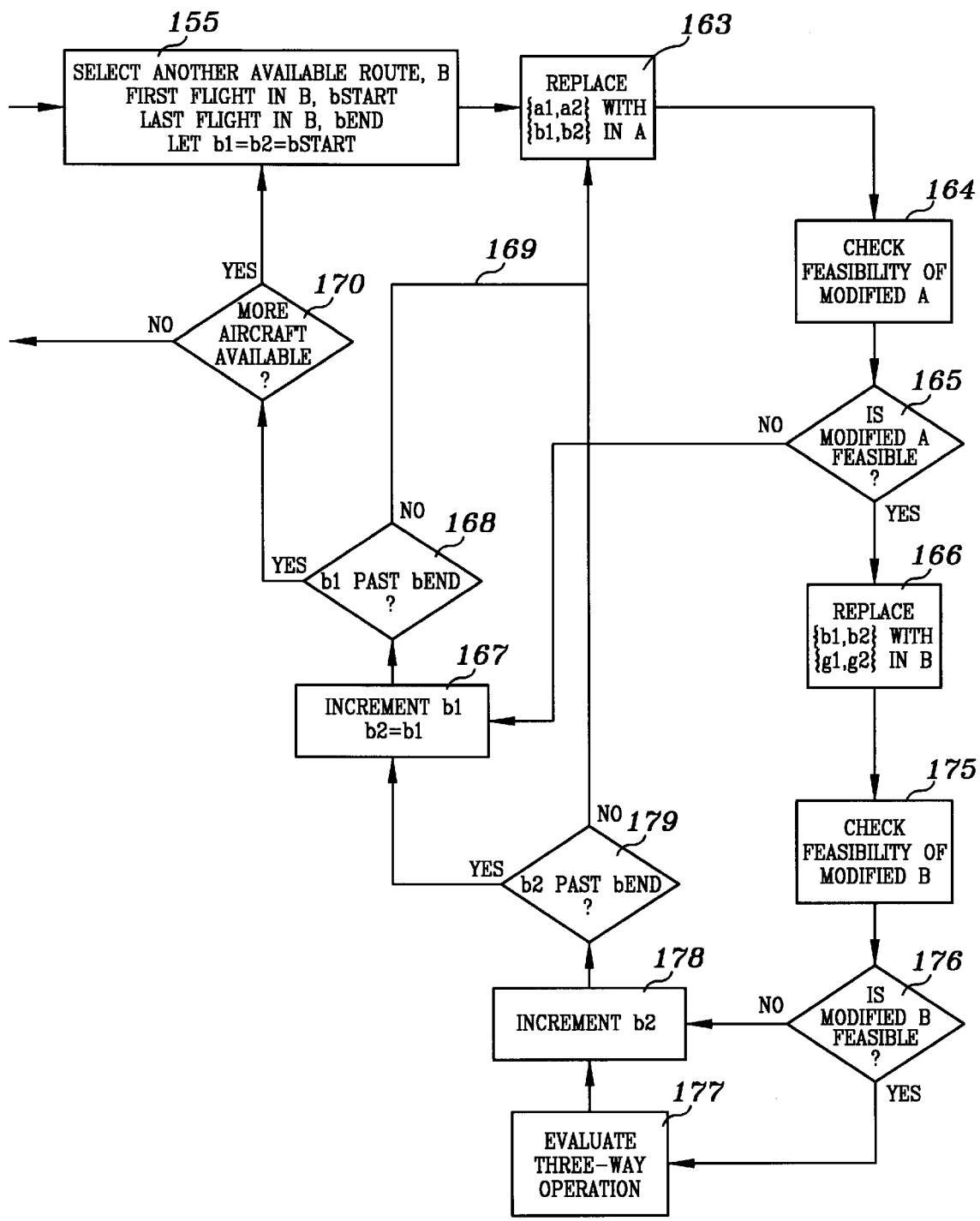

Referring to FIGS. 7A and 7B, a logic flow diagram of the operation of the invention in executing a Three-Way Operation is illustrated, in which flight sequences among one Grounded Aircraft Route G and two other Available Aircraft Routes are exchanged. At logic step 150 of FIG. 7A, information which is input to the operation includes the flight sequence of the grounded route G, the flight sequence of one other Available Aircraft Route A, the first flight in route G referred to as gSTART, the first flight in route A referred to as aSTART, the last flight in route G referred to as gEND, and the last flight in route A referred to as aEND.

From logic step 150, the logic flow process continues to logic step 151 where pointers g1 and g2 are set to point to gSTART, and pointers a1 and a2 are set to point to aSTART. Thereafter, at logic step 152, g1,g2 is replaced by a1,a2 in G, and at logic step 153 the feasibility of the modified route G is tested. At logic step 154 the result of the test conducted at logic step 153 is determined. If the modified route G is feasible, the logic flow process moves from logic step 154 to logic step 155 of FIG. 7B. If such test results indicate that the route G is infeasible, however, the logic flow process continues along logic path 156 of FIG. 7A to logic step 157, where g2 is incremented by one to include a next occurring flight leg of route G. The pointers a1 and a2 continue to point to aSTART. Thereafter, the logic flow process moves to logic step 158 where a determination is made whether g2 has been incremented past gEND. If not, the logic flow process loops back along logic path 159 to logic step 152 where the process continues as before described. If g2 has been incremented past gEND at logic step 158, however, the logic flow process continues from logic step 158 to logic step 160, where g1 is incremented by one and g2 is set equal to g1. Thereafter at logic step 161, a determination is made whether g1 has been incremented past gEND. If not, the logic flow process loops back alone logic path 159 to logic step 152 to continue as before described. If g1 has been incremented past gEND at logic step 161, however, the Three-Way Operation is terminated at logic step 162 and the logic flow process jumps to logic step 46 of FIG. 3. Otherwise, the logic flow process loops back along logic path 159 to logic step 152 to continue as before described.

At logic step 155 of FIG. 7B, another Available Aircraft Route B is selected and the information referring to the first flight in route B, bSTART, and the last flight in route B, bEND, is received. Further, the pointers b1 and b2 are set to designate bSTART. From logic step 155, the logic flow process continues to logic step 163 where the flight sequence designated by a1,a2 in route A is replaced by the flight sequence designated by b1,b2 of route B. Thereafter, at logic step 164, the feasibility of the modified route A is tested, and at logic step 165 a feasibility determination is made. If the modified route A is found to be feasible, the logic flow process moves from logic step 165 to logic step 166, where the flight sequence designated by b1,b2 of route B is replaced by the flight sequence designated by g1,g2 of route G.

If the modified route A is not found to be feasible at logic step 165, the logic flow process jumps to logic step 167 where b1 is incremented by one and pointer b2 is set to be identical to pointer b1. The logic flow then continues from logic step 167 to logic step 168 to determine whether pointer b1 has been incremented past bEND. If not, the logic flow process moves along logic path 169 to logic step 163 to continue as before described. If it is found at logic step 168 that b1 has been incremented past bEND, however, the logic flow process jumps from logic step 168 to logic step 170 where it is determined whether any other Available Aircraft Routes exist. That is, when all sequences b have been selected for one available aircraft, then another available aircraft is selected. If an additional available aircraft exists, the logic flow process continues from logic step 170 to logic step 155 to continue as before described. If no additional available aircraft are discerned at logic step 170, however, the logic flow jumps from logic step 170 to logic step 171 of FIG. 7A where the pointer a2 is incremented by one.

From logic step 171, the logic flow process continues to logic step 172 to determine whether a2 has been incremented past aEND. If not, the logic flow process loops back along logic path 159 to logic step 152 to continue as before described. If a2 is found at logic step 172 to have been incremented past aEND, the logic flow process proceeds from logic step 172 to logic step 173, where a1 is incremented by one and a2 is made identical to a1. Thereafter, at logic step 174, a determination is made whether a1 has been incremented past aEND. If not, the logic flow process loops back along logic path 159 to logic step 152 to continue as before described. If a1 is found to have been incremented past aEND at logic step 174, however, the logic flow process continues to logic step 157 to proceed as before described.

Returning to logic step 166 of FIG. 7B, the flight sequence of route B designated by b1,b2 is replaced by the flight sequence of route G designated by g1,g2. Thereafter, the feasibility of the modified route B is tested at logic step 175, and a determination is made at logic step 176 whether the modified route B was found to be feasible. If so, the logic flow process continues to logic step 177 where the results of the Three-Way Operation are evaluated in accordance with the logic flow of FIG. 5. Following logic step 177 of FIG. 7B, the logic flow process proceeds to logic step 178 to increment b2 and thereby include another flight leg of route B. If the modified route B is not found to be feasible at logic step 176, then the logic flow process proceeds directly from logic step 176 to logic step 178.

From logic step 178, the logic flow process continues to logic step 179 to determine whether b2 has been incremented past bEND. If so, the logic flow process jumps from logic step 179 to logic step 167 to continue as before described. If not, the logic flow process proceeds from logic step 179 to logic step 163 to continue as before described.

From the above it is seen that Unary, Binary, and Three-Way Operations have been applied to a Grounded Aircraft Route to generate the grounded route's neighborhood, and an evaluator and a marginal value calculator have been applied to identify feasible neighbors with the best marginal value for repairing the Grounded Aircraft Route under consideration. The evaluator as depicted in the logic flow of FIG. 5 checks to make Sure that none of the operations constraints and used requirements have been violated, and also verifies route continuity. That is, make sure that every flight's departure station is identical to the previous flight's arrival station, and repair route discontinuities with Ferry Flights, if permitted. If a route discontinuity cannot be repaired, the route is discarded as infeasible.

The marginal value calculator provides a prioritized and weighted evaluation of route attributes such as quantity of cancelled flights, Canceled Passengers, delayed flights, delayed passengers, delayed flight minutes, swapped flights, Displaced Passengers, broken through flights, broken through passengers, Ferry Flights, and related costs.

Figure 8:
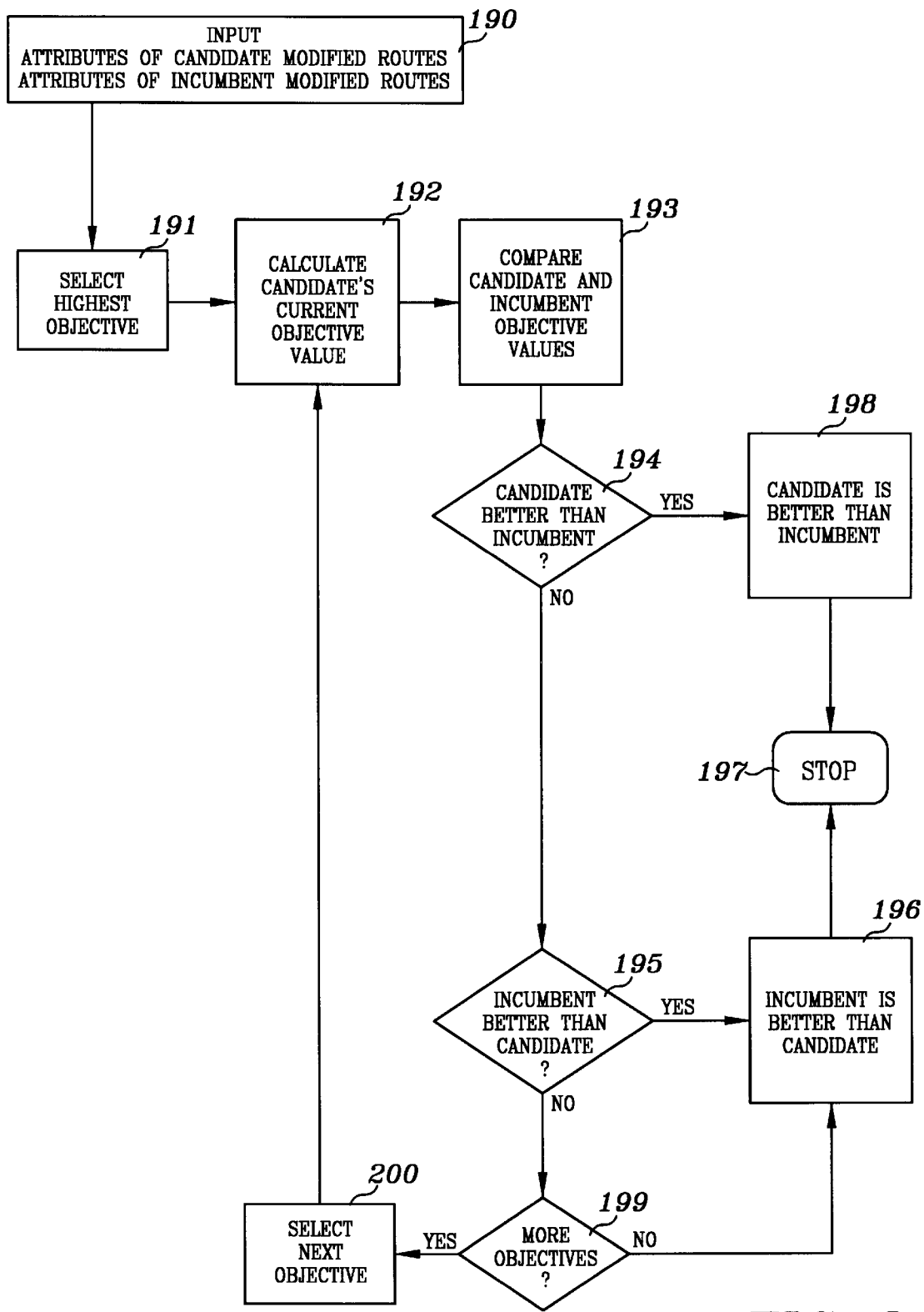
FIG. 8 is a logic flow diagram of the operation of a marginal value calculator in accordance with the invention.

Referring to FIG. 8, a logic flow diagram of a marginal value calculator is illustrated. The marginal value calculator is a means for comparing a candidate set of modified routes with an incumbent set of modified routes, and determining if the candidate is better. The calculator contains a list of attributes, a matrix of weights for the attributes, and a list of equivalence thresholds for differentiating the candidate from the incumbent. The values in the matrix of attribute weights define the importance of an attribute at a specific objective level. For example, the (i,j)the value in the matrix stipulates the weight that attribute j will have in objective i.

The objectives are evaluated sequentially from 1 to n, where n is the maximum depth of the objective hierarchy. The list of equivalence thresholds is associated with the objectives. That is, the $i^{th}$ value in the list is associated with the $i^{th}$ objective.

The equivalence thresholds are used to determine whether the candidate route is equivalent to the incumbent route. For example, a candidate route and an incumbent route are judged to be equal for a particular objective, if the absolute difference of the candidate's objective value and the incumbent's objective value is less than or equal to the threshold value. Otherwise, either the candidate route or the incumbent route is better, depending upon the objective.

At logic step 190 of FIG. 8, the logic flow process receives attributes of candidate modified routes, and attributes of the incumbent modified routes. Thereafter, at logic step 191 the highest objective not yet compared is selected. At the start, objective 1 would be selected. From logic step 191 the logic flow process continues to logic step 192, where a candidate's current objective value is calculated. The calculation is the wieghted sum of the attribute values based on the weights at the selected objective's level in the matrix of attribute weights. The logic flow process then proceds from logic step 192 to logic step 193 where the candidate and incumbent objective values are compared. Thereafter, at logic step 194 a determination is made whether the objective value of the candidate is better. If not, a determination is made at logic step 195 whether the incumbent objective value is better. If so, the incumbent modified routes are retained at logic step 196, and the marginal value calculator process is exited at logic step 197. If the candidate's objective value is determined to be better at logic step 194, however, the logic flow process jumps from logic step 194 to logic step 198 where the candidate modified routes replace the incumbent modified routes as the new incumbent. Thereafter, the marginal value calculator process is exited at logic step 197.

If the incumbent objective value is not determined to be better than that of the candidate at logic step 195, the logic flow process continues from logic step 195 to logic step 199, where a determination is made whether any additional objectives exist. If not, the logic flow process moves to logic step 196 to continue as before described. If more objectives exist, however, the logic flow process proceeds from logic step 199 to logic step 200 to select the next objective. Thereafter, the logic flow process moves to logic step 192 to continue as before described.

By way of example in understanding the concept of the marginal value calculator, it is assumed that a specific marginal value calculator has the following attributes: quantity of cancelled flights, cancelled passengers, delayed flights, delayed passengers, delayed flight minutes, swapped flights, broken through flights, broken through passengers, Ferry Flights, subfleets out of position, flight revenue and costs related to flight operations, flight cancellations, flight delay minutes, flight swaps, and Displaced Passengers.

In the above terms, a through flight is one which has flight legs passing through an interim station before reaching a destination. If one of the flight legs of the through flight's flight sequence is cancelled or rerouted, a broken through flight occurs. Passengers who were to be on the cancelled or rerouted flight leg become broken through passengers. Broken through passengers who have no replacement flight leg on which to fly become Displaced Passengers.

The marginal value calculator further has the following hierarchical objectives: 1) maximize the income which equals the difference of the flight revenue and the sum of all the defined costs; 2) minimize the sum of the cancelled and delayed flights; and 3) minimize the quantity of cancelled passengers.

Next, by way of example only, the objective threshold list is set as follows: $5000, 2, and 0. Thus, a candidate and an incumbent are judged to have met the first threshold if the absolute difference of their income is less than or equal to $5000. If the absolute difference of their sums of cancelled and delayed flights is less than or equal to 2, then the candidate and incumbent have met the second threshold.

If the candidate and incumbent have met the first two objective threshold levels, then the third threshold level is used to determine whether the candidate or the incumbent modified routes is the better. In this example, the candidate is better only if it has fewer cancelled passengers than the incumbent.

If the second objective became the final determiner of which route is better, the candidate would be better only if its sum of cancelled and delayed flights is less than that of the incumbent's sum of cancelled and delayed flights minus two. If the first objective became the final determiner, the candidate would be better only if its income exceeded the incumbent's income by more than $5000.

In the operation of the marginal value calculator, attribute weights are set to reflect the hierarchical objectives. For instance, in the example given above, the weights for every attribute at the third objective level except the cancelled passengers attribute are zero. This implies that only the cancelled passengers attribute contributes to the calculation of the objective value. Conversely, none of the other attributes, no matter how large or sinall, may affect the calculation of the objective value.

Figure 9:
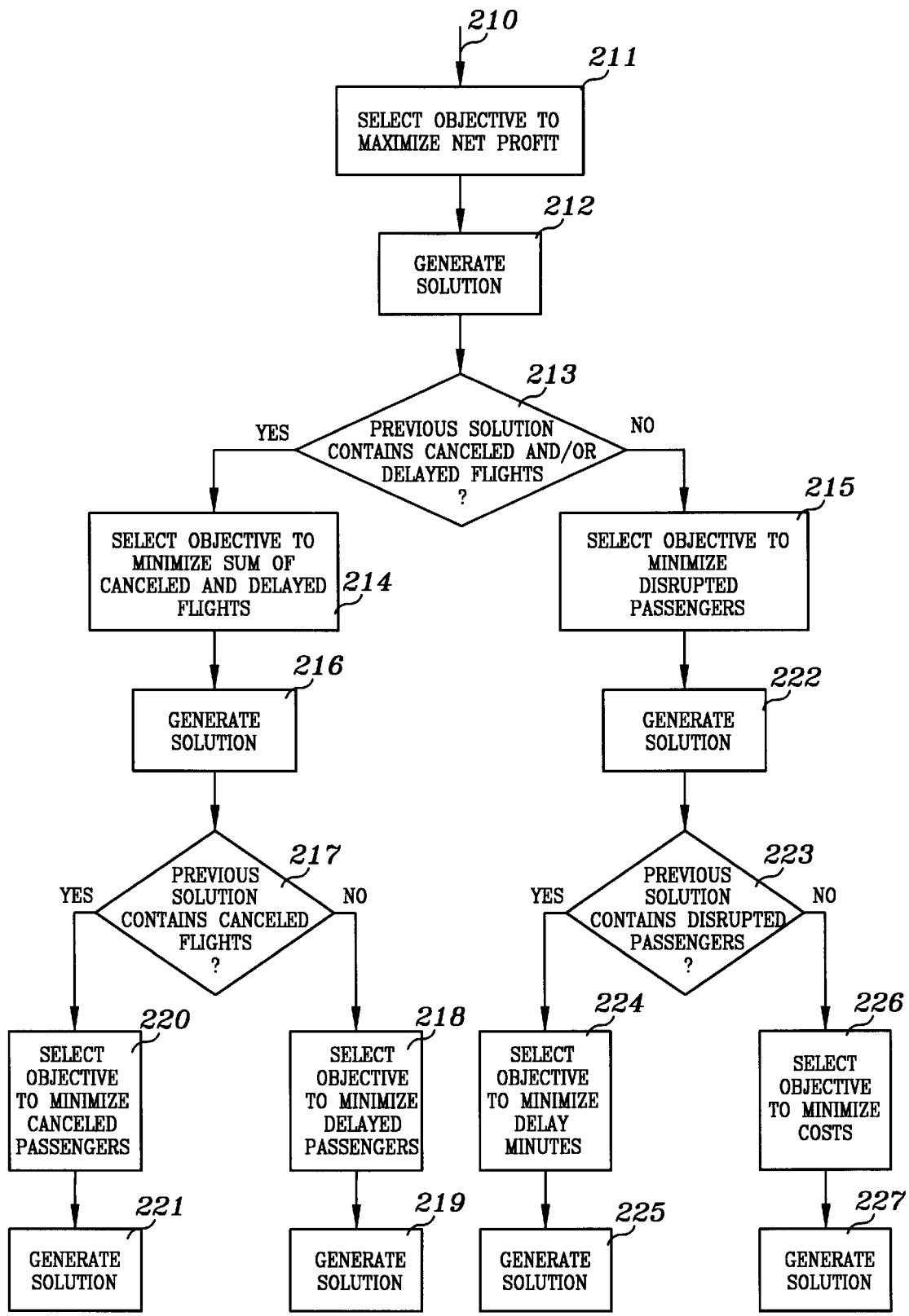
FIG. 9 is a logic flow diagram of a decision tree used in accordance with the invention to select among plural marginal value calculators to provide multiple solutions.

Referring to FIG. 9, a decision tree selection process for selecting among plural marginal value calculators is illustrated. Multiple solutions for a particular flight schedule problem are generated through the selection of multiple marginal value calculators. That is, one solution is generated for each calculator. A decision tree is used to determine which calculator to select, and thereby controls the variety of solutions generated.

The logic flow process enters logic step 211 of FIG. 9 by way of a logic path 210 leading from logic flow step 32 in FIG. 2 and selects an objective to maximize net profit as a condition for an acceptable solution. From logic step 211 of FIG. 9, the logic flow process continues to logic step 212 to generate a solution, and thereafter moves to logic step 213 to determine whether the solution that has been generated contains cancelled or delayed flights. If so, the logic flow process jumps from logic step 213 to logic step 214 to select an objective to minimize the sum of cancelled and delayed flights. If the solution generated at logic step 212 does not contain cancelled or delayed flights, the logic flow process jumps from logic step 213 to logic step 215 to select an objective to minimize disrupted passengers.

From logic step 214, the logic flow process moves to logic step 216 to generate a solution, and then proceeds to logic step 217 to determine whether the solution contains cancelled flights. If no cancelled flights are detected, then the logic flow process jumps from logic step 217 to logic step 218 to select the objective to minimize delayed passengers. Thereafter, a final solution is generated at logic step 219.

If cancelled flights are detected at logic step 217, the logic flow process jumps to logic step 220 to select an objective to minimize cancelled passengers, and thereafter generates a final solution at logic step 221.

From logic step 215, the logic flow process continues to logic step 222 to generate a solution, and thereafter moves to logic step 223 to test the solution for disrupted passengers. If disrupted passengers are detected, the logic flow process proceeds from logic step 223 to logic step 224 to select an objective to minimize delay minutes. Thereafter, the logic flow process continues to logic step 225 to generate a final solution.

If at logic step 223 disrupted passengers are detected, the logic flow process proceeds from logic step 223 to logic step 226 to select an objective to minimize costs. Thereafter, at logic step 227, a final solution is generated.

For the example illustrated, three solutions will be returned to the user. However, the three solutions may fulfill different sets of objectives.

The solution generation operations described above may be made more efficient or streamlined, for more rapid generation of solutions, by observing the following solution conditions:

1. If a route modified by an operation is not feasible because at least one of its flights is delayed longer than the allowed maximum delay, or its departure violates its origin station departure curfew (time during which the aircraft is allowed to depart a station), or its arrival violates its destination station arrival curfew (time during which the aircraft is allowed to land at a destination), then do not attempt to uncancel flights to that route. This is effective because a route that is infeasible due to a time constraint violation cannot be made feasible by adding more flights to it. Thus, if an operation produces a time-infeasible route, the effort to generate all possible uncancel routes for an uncancel combination operation can be avioded.

For example:

If a Grounded Aircraft Route is time-infeasible in its original state, then do not attempt the Uncancel Operation.

If a Move Operation produces a time-infeasible Grounded Aircraft Route, do not attempt the Move And Uncancel To Source Operation.

If a Move Operation produces a time-infeasible Available Aircraft Route, do not attempt the Move And Uncancel To Target Operation.

If a Swap Operation produces a time-infeasible Grounded Aircraft Route and/or Available Aircraft Route, do not attempt either of the Swap And Uncancel Operations.

2. Empirical results have indicated that a route that is modified at more than one location does not provide better results than if the modification is limited to one location. Thus, rather than searching throughout a route for placing a sequence of flights, the placement can be made at the position where a previous sequence has been removed.

For example:

The Cancel And Uncancel Operation is a strict exchange of cancel and uncancel flight sequences in the Grounded Aircraft Route.

A Swap Operation is a strict exchange of flight sequences and not a combination of two Move Operations.

For the Move And Uncancel Operations, and the Swap And Uncancel Operations, the uncanceling of the flights should be made to the position where the moved or swapped flights are inserted.

In the Move And Cancel Operations and the Swap And Cancel Operations, the sequence of flights to be cancelled should be contiguous to the moved or swapped sequences.

3. If the ferry creation indicator is set to false, thus prohibiting the creation of Ferry Flights, then all operations must result in space-contiguous routes. This implies that every flight in a route must have its origin match the route's previous flight's destination. This condition prohibits the insertion of a sequence of flights into a route if the insertion violates space-contiguity. This also prohibits the removal of a sequence of flights from a route if the removal creates a space-discontiguity.

For example, if the Grounded Aircraft Routes and the Available Aircraft Routes begin as space-contiguous routes:

A sequence in the Cancel Operation must have the same origin and destination.

A sequence in the Uncancel Operation must have the same origin and destination.

For the Cancel And Uncancel Operation, the cancel sequence's origin must match the uncancel sequence's origin, and the cancel sequence's destination must match the uncancel sequence's destination.

The Move Operation requires the sequence of flights being moved to have the same origin and destination which also match the insertion point.

The cancel and uncancel sequences in the Move And Cancel Operations, and the Move And Uncancel Operations must have the same origin and destination.

The flight sequences in a Swap Operation must have matching origins and matching destinations.

The uncancel sequences in the Swap And Uncancel Operations must have the same origin and destination.

For the Swap And Cancel From Source Operations, and the Swap And Cancel From Target Operations, the cancellation sequence must have the same origin and destination.

In the Swap And Cancel From Source And Target Operation, the origin of the cancel sequence from one route must match the destination of the cancel sequence from the other route.

4. If a cancel protected flight is within a cancel sequence, do not generate other cancel sequences containing this flight. Thus, as cancel sequences are generated, whenever a cancel protected flight is encountered, all sequences containing this flight can be abandoned because they cannot be cancelled.

5. Do not generate a flight sequence to be moved to an aircraft if any of the flights in the sequence cannot be flown by the aircraft. If an aircraft is not permitted to fly a particular flight, then all sequences that would be used in a Move or Swap combination operation to assign the flight to the aircraft can be abandoned.

Examples of the operations described above follow. In the examples, "Source" routes refer to Grounded Aircraft Routes; "Target" routes refer to Available Aircraft Routes; and bold, underline, or italics is used to help the reader identify moved and cancelled flight sequences. Further, the number within parenthesis following "Source" or "Target" refers respectively to the identifier of the source or target aircraft. The number within parenthesis between the standard airport designations (e.g., IAH, MTY, etc.) identifies the flight identifier for that particular flight leg, with its origin airport preceding it and its destination airport succeeding it.

TABLE I

CANCEL OPERATION

Original Routes

Source (508) IAH (0597) MTY
MTY (0594) IAH
IAH (0593) MTY
MTY (0596) IAH
IAH (1060) STL
STL (1067) IAH New Routes Source (508) IAH (0593) MTY
MTY (0596) IAH
IAH (1060) STL
STL (1067) IAH
Canceled: IAH (0597) MTY
MTY (0594) IAH

TABLE II

UNCANCEL OPERATION

Original Routes

Source (508) IAH (0597) MTY
MTY (0594) IAH
IAH (0593) MTY
MTY (0596) IAH
IAH (1060) STL
STL (1067) IAH
Canceled: IAH (0531) AUS
AUS (0532) IAH

New Routes

Source (508) IAH (0531) AUS
AUS (0532) IAH
IAH (0597) MTY
MTY (0594) IAH
IAH (0593) MTY
MTY (0596) IAH
IAH (1060) STL
STL (1067) IAH

TABLE III

CANCEL AND UNCANCEL OPERATION

Original Routes

Source (508) IAH (0597) MTY
MTY (0594) IAH
IAH (0593) MTY
MTY (0596) IAH
IAH (1060) STL
STL (1067) IAH
Canceled1 IAH (0531) AUS
AUS (0532) IAH New Routes Source (508) IAH (0531) AUS
AUS (0532) IAH
IAH (0593) MTY
MTY (0596) IAH
IAH (1060) STL
STL (1067) IAH

TABLE III-continued

CANCEL AND UNCANCEL OPERATION

| | |
|---|---|
| Canceled1 | |
| Canceled2 | IAH (0597) MTY |
| | MTY (0594) IAH |

TABLE IV

MOVE OPERATION

Original Routes

| | |
|---|---|
| Source (508) | IAH (0597) MTY |
| | MTY (0594) IAH |
| | IAH (0593) MTY |
| | MTY (0596) IAH |
| | IAH (1060) STL |
| | STL (1067) IAH |
| Target (506) | DFW (1768) IAH |
| | IAH (1768) SDF |
| | SDF (1767) IAH |
| | IAH (1862) GSO |
| | GSO (1865) IAH |

New Routes

| | |
|---|---|
| Source (508) | IAH (0593) MTY |
| | MTY (0596) IAH |
| | IAH (1060) STL |
| | STL (1067) IAH |
| Target (506) | DFW (1768) IAH |
| | IAH (0597) MTY |
| | MTY (0594) IAH |
| | IAH (1768) SDF |
| | SDF (1767) IAH |
| | IAH (1862) GSO |
| | GSO (1865) IAH |

TABLE V

MOVE AND CANCEL FROM TARGET

Original Routes

| | |
|---|---|
| Source (508) | IAH (0597) MTY |
| | MTY (0594) IAH |
| | IAH (0593) MTY |
| | MTY (0596) IAH |
| | IAH (1060) STL |
| | STL (1067) IAH |
| Target (506) | DFW (1768) IAH |
| | <u>IAH (1768) SDF</u> |
| | <u>SDF (1767) IAH</u> |
| | IAH (1862) GSO |
| | GSO (1865) IAH |

New Routes

| | |
|---|---|
| Source (508) | IAH (0593) MTY |
| | MTY (0596) IAH |
| | IAH (1060) STL |
| | STL (1067) IAH |
| Target (506) | DFW (1768) IAH |
| | IAH (0597) MTY |
| | MTY (0594) IAH |
| | IAH (1862) GSO |
| | GSO (1865) IAH |
| Canceled: | <u>IAH (1768) SDF</u> |
| | <u>SDF (1767) IAH</u> |

TABLE VI

MOVE AND CANCEL FROM SOURCE OPERATION

Original Routes

| | |
|---|---|
| Source (508) | <u>IAH (0597) MTY</u> |
| | <u>MTY (0594) IAH</u> |
| | IAH (0593) MTY |
| | MTY (0596) IAH |
| | IAH (1060) STL |
| | STL (1067) IAH |
| Target (506) | DFW (1768) IAH |
| | IAH (1768) SDF |
| | SDF (1767) IAH |
| | IAH (1862) GSO |
| | GSO (1865) IAH |

New Routes

| | |
|---|---|
| Source (508) | IAH (1060) STL |
| | STL (1067) IAH |
| Target (506) | DFW (1768) IAH |
| | IAH (0593) MTY |
| | MTY (0596) IAH |
| | IAH (1768) SDF |
| | SDF (1767) IAH |
| | IAH (1862) GSO |
| | GSO (1865) IAH |
| Canceled: | <u>IAH (0597) MTY</u> |
| | <u>MTY (0594) IAH</u> |

TABLE VII

MOVE AND CANCEL FROM TARGET AND FROM SOURCE

Original Routes

| | |
|---|---|
| Source (508) | IAH (0597) MTY |
| | MTY (0594) IAH |
| | <u>IAH (0593) MTY</u> |
| | <u>MTY (0596) IAH</u> |
| | IAH (1060) STL |
| | STL (1067) IAH |
| Target (506) | DFW (1768) IAH |
| | IAH (1768) SDF |
| | SDF (1767) IAH |
| | IAH (1862) GSO |
| | GSO (1865) IAH |

New Routes

| | |
|---|---|
| Source (508) | IAH (1060) STL |
| | STL (1067) IAH |
| Target (506) | DFW (1768) IAH |
| | IAH (0597) MTY |
| | MTY (0594) IAH |
| | IAH (1862) GSO |
| | GSO (1865) IAH |
| Canceled1 | IAH (1768) SDF |
| | SDF (1767) IAH |
| Canceled2 | <u>IAH (0593) MTY</u> |
| | <u>MTY (0596) IAH</u> |

TABLE VIII

MOVE AND UNCANCEL TO TARGET OPERATION

Original Routes

| | |
|---|---|
| Source (508) | IAH (0597) MTY |
| | MTY (0594) IAH |
| | IAH (0593) MTY |
| | MTY (0596) IAH |
| | IAH (1060) STL |
| | STL (1067) IAH |
| Target (506) | DFW (1768) IAH |
| | IAH (1768) SDF |

TABLE VIII-continued

MOVE AND UNCANCEL TO TARGET OPERATION

|  |  |
|---|---|
|  | SDF (1767) IAH |
|  | IAH (1862) GSO |
|  | GSO (1865) IAH |
| Canceled: | IAH (0531) AUS |
|  | AUS (0532) IAH |
|  | New Routes |
| Source (508) | IAH (0593) MTY |
|  | MTY (0596) IAH |
|  | IAH (1060) STL |
|  | STL (1067) IAH |
| Target (506) | DFW (1768) IAH |
|  | IAH (0597) MTY |
|  | MTY (0594) IAH |
|  | IAH (0531) AUS |
|  | AUS (0532) IAH |
|  | IAH (1768) SDF |
|  | SDF (1767) IAH |
|  | IAH (1862) GSO |
|  | GSO (1865) IAH |

TABLE IX

MOVE AND UNCANCEL TO SOURCE OPERATION

|  |  |
|---|---|
|  | Original Routes |
| Source (508) | IAH (0597) MTY |
|  | MTY (0594) IAH |
|  | IAH (0593) MTY |
|  | MTY (0596) IAH |
|  | IAH (1060) STL |
|  | STL (1067) IAH |
| Target (506) | DFW (1768) IAH |
|  | IAH (1768) SDF |
|  | SDF (1767) IAH |
|  | IAH (1862) GSO |
|  | GSO (1865) IAH |
| Canceled: | IAH (0531) AUS |
|  | AUS (0532) IAH |
|  | New Routes |
| Source (508) | IAH (0531) AUS |
|  | AUS (0532) IAH |
|  | IAH (0593) MTY |
|  | MTY (0596) IAH |
|  | IAH (1060) STL |
|  | STL (1067) IAH |
| Target (506) | DFW (1768) IAH |
|  | IAH (0597) MTY |
|  | MTY (0594) IAH |
|  | IAH (1768) SDF |
|  | SDF (1767) IAH |
|  | IAH (1862) GSO |
|  | GSO (1865) IAH |

TABLE X

SWAP OPERATION

|  |  |
|---|---|
|  | Original Routes |
| Source (508) | IAH (0597) MTY |
|  | MTY (0594) IAH |
|  | IAH (0593) MTY |
|  | MTY (0596) IAH |
|  | IAH (1060) STL |
|  | STL (1067) IAH |
| Target (506) | DFW (1768) IAH |
|  | IAH (1768) SDF |
|  | SDF (1767) IAH |
|  | IAH (1862) GSO |

TABLE X-continued

SWAP OPERATION

|  |  |
|---|---|
|  | GSO (1865) IAH |
|  | New Routes |
| Source (508) | IAH (1768) SDF |
|  | SDF (1767) IAH |
|  | IAH (0593) MTY |
|  | MTY (0596) IAH |
|  | IAH (1060) STL |
|  | STL (1067) IAH |
| Target (506) | DFW (1768) IAH |
|  | IAH (0597) MTY |
|  | MTY (0594) IAH |
|  | IAH (1862) GSO |
|  | GSO (1865) IAH |

TABLE XI

SWAP AND CANCEL FROM TARGET OPERATION

|  |  |
|---|---|
|  | Original Routes |
| Source (508) | IAH (0597) MTY |
|  | MTY (0594) IAH |
|  | IAH (0593) MTY |
|  | MTY (0596) IAH |
|  | IAH (1060) STL |
|  | STL (1067) IAH |
| Target (506) | DFW (1768) IAH |
|  | IAH (1768) SDF |
|  | SDF (1767) IAH |
|  | IAH (1862) GSO |
|  | GSO (1865) IAH |
|  | New Routes |
| Source (508) | IAH (0597) MTY |
|  | MTY (0594) IAH |
|  | IAH (1862) GSO |
|  | GSO (1865) IAH |
| Target (506) | DFW (1768) IAH |
|  | IAH (0593) MTY |
|  | MTY (0596) IAH |
|  | IAH (1060) STL |
|  | STL (1067) IAH |
| Canceled: | IAH (1768) SDF |
|  | SDF (1767) TAH |

TABLE XII

SWAP AND CANCEL FROM SOURCE OPERATION

|  |  |
|---|---|
|  | Original Routes |
| Source (508) | IAH (0597) MTY |
|  | MTY (0594) IAH |
|  | IAH (0593) MTY |
|  | MTY (0596) IAH |
|  | IAH (1060) STL |
|  | STL (1067) IAH |
| Target (506) | DFW (1768) IAH |
|  | IAH (1768) SDF |
|  | SDF (1767) IAH |
|  | IAH (1862) GSO |
|  | GSO (1865) IAH |
|  | New Routes |
| Source (508) | IAH (1768) SDF |
|  | SDF (1767) IAH |
|  | IAH (1862) GSO |
|  | GSO (1865) IAH |
| Target (506) | DFW (1768) IAH |
|  | IAH (0593) MTY |
|  | MTY (0596) IAH |

TABLE XII-continued

SWAP AND CANCEL FROM SOURCE OPERATION

|  |  |
|---|---|
|  | IAH (1060) STL |
|  | STL (1067) IAH |
| Canceled: | IAH (0597) MTY |
|  | MTY (0594) IAH |

TABLE XIII

SWAP AND CANCEL FROM TARGET AND FROM SOURCE OPERATION

Original Routes

| | |
|---|---|
| Source (508) | IAH (0597) MTY |
| | MTY (0594) IAH |
| | IAH (0593) MTY |
| | MTY (0596) IAH |
| | IAH (1060) STL |
| | STL (1067) IAH |
| Target (506) | DFW (1768) IAH |
| | IAH (1768) SDF |
| | SDF (1767) IAH |
| | IAH (1862) GSO |
| | GSO (1865) IAH |

New Routes

| | |
|---|---|
| Source (508) | IAH (1862) GSO |
| | GSO (1865) IAH |
| Target (506) | DFW (1768) IAH |
| | IAH (0593) MTY |
| | MTY (0596) IAH |
| | IAH (1060) STL |
| | STL (1067) IAH |
| Canceled1 | IAH (1768) SDF |
| | SDF (1767) IAH |
| Canceled2 | IAH (0597) MTY |
| | MTY (0594) IAH |

TABLE XIV

SWAP AND UNCANCEL TO TARGET OPERATION

Original Routes

| | |
|---|---|
| Source (508) | IAH (0597) MTY |
| | MTY (0594) TAH |
| | IAH (0593) MTY |
| | MTY (0596) IAH |
| | IAH (1060) STL |
| | STL (1067) IAH |
| Target (506) | DFW (1768) IAH |
| | IAH (1768) SDF |
| | SDF (1767) IAH |
| | IAH (1862) GSO |
| | GSO (1865) IAH |
| Canceled1 | IAH (0531) AUS |
| | AUS (0532) IAH |

New Routes

| | |
|---|---|
| Source (508) | TAH (0597) MTY |
| | MTY (0594) IAH |
| | IAH (1768) SDF |
| | SDF (1767) IAH |
| | IAH (1862) GSO |
| | GSO (1865) IAH |
| Target (506) | DFW (1768) IAH |
| | IAH (0531) AUS |
| | AUS (0532) IAH |
| | IAH (0593) MTY |
| | MTY (0596) IAH |
| | IAH (1060) STL |
| | STL (1067) IAH |

TABLE XV

SWAP AND UNCANCEL TO SOURCE OPERATION

Original Routes

| | |
|---|---|
| Source (508) | IAH (0597) MTY |
| | MTY (0594) IAH |
| | IAH (0593) MTY |
| | MTY (0596) IAH |
| | IAH (1060) STL |
| | STL (1067) IAH |
| Target (506) | DFW (1768) IAH |
| | IAH (1768) SDF |
| | SDF (1767) IAH |
| | IAH (1862) GSO |
| | GSO (1865) IAH |
| Canceled1 | IAH (0531) AUS |
| | AUS (0532) IAH |

New Routes

| | |
|---|---|
| Source (508) | IAH (0531) AUS |
| | AUS (0532) IAH |
| | IAH (1768) SDF |
| | SDF (1767) IAH |
| | IAH (1060) STL |
| | STL (1067) IAH |
| Target (506) | DFW (1768) IAH |
| | IAH (0597) MTY |
| | MTY (0594) IAH |
| | IAH (0593) MTY |
| | MTY (0596) IAH |
| | IAH (1862) GSO |
| | GSO (1865) IAH |

TABLE XVI

THREE-WAY SWAP OPERATION

Original Routes

| | |
|---|---|
| Source (508) | IAH (0597) MTY |
| | MTY (0594) IAH |
| | IAH (0593) MTY |
| | MTY (0596) IAH |
| | IAH (1060) STL |
| | STL (1067) IAH |
| Target (506) | DFW (1768) IAH |
| | IAH (1768) SDF |
| | SDF (1767) IAH |
| | IAH (1862) GSO |
| | GSO (1865) IAH |
| Target (507) | IAH (1865) MAF |
| | MAF (1606) IAH |
| | IAH (1606) CLT |
| | CLT (0599) IAH |
| | IAH (0599) MTY |
| | MTY (0592) IAH |

New Routes

| | |
|---|---|
| Source (508) | IAH (1768) SDF |
| | SDF (1767) IAH |
| | IAH (0593) MTY |
| | MTY (0596) IAH |
| | IAH (1060) STL |
| | STL (1067) IAH |
| Target (506) | DFW (1768) IAH |
| | IAH (1865) MAF |
| | MAF (1606) IAH |
| | IAH (1862) GSO |
| | GSO (1865) IAH |
| Target (507) | IAH (0597) MTY |
| | MTY (0594) IAH |
| | IAH (1606) CLT |
| | CLT (0599) IAH |
| | IAH (0599) MTY |
| | MTY (0592) IAH |

Recall that for the Binary Operations, the Grounded Aircraft Route is treated as the source and the Available Aircraft Route is treated as the target. The following operations, Move, Move And Cancel From Source, Move And Cancel From Target, Move And Cancel From Source And Target, Move And Uncancel To Source, and Move And Uncancel To Target, are also valuable operations if the source is the Available Aircraft Route and the target is the Grounded Aircraft Route. This reversal of source and target leads to the Reverse Binary Operations analogous to the Move and combination operations of the Binary Operations.

The Reverse Binary Operations can be entered immediately after logic step 44 in FIG. 3. After logic step 44, the Grounded Aircraft Route and the Available Aircraft Routes are respectively re-labeled as Available Aircraft Route and Grounded Aircraft Routes. The Reverse Binary Operations then are entered. Upon completion of the Reverse Binary Operations, the Grounded Aircraft Routes and the Available Aircraft Route are re-labeled so that the Available Aircraft Route becomes the Grounded Aircraft Route, and the Grounded Aircraft Routes become Available Aircraft Routes according to their original labels. Thereafter, the Three-Way Operation is entered at logic step 45.

The Reverse Binary Operations proceed exactly like the Binary Operations in FIGS. 6A and 6B with the following exceptions. After logic step 105, proceed directly to logic step 109, skipping logic steps 106, 107, and 108. Additionally, after logic step 113, logic path 114 is skipped and the logic flow process proceeds directly to logic step 126, where it is determined if more cancellation sequences exist in G. If so, logic step 127 is skipped and the logic flow process continues to logic step 109. If not, then the logic flow process skips logic steps 130 and 135, and continues to logic step 136. In general, these modifications avoid the Swap and its combination operations which are performed in the Binary Operations, and need not be repeated in the Reverse Binary Operations.

What is claimed is:

1. An automated, real-time aircraft optimization engine for generating multiple solutions to repair disruptions in aircraft routes, which comprises:

a memory system having stored therein memory objects defining an existing flight environment;

an optimization server receiving an aircraft problem specification including user requirements from a user;

a microprocessor in electrical communication with said memory system and said optimization server, and receiving said memory objects and said aircraft problem specification, for generating multiple solutions through use of plural marginal value calculators and an integrated combination of operations on grounded aircraft routes and available aircraft routes to effect flight leg moves, flight leg swaps, flight leg cancellations creating phantom routes, flight leg delays, and flight leg creations as required, to produce reparations for said grounded aircraft routes comprising at least one of modified grounded aircraft routes, modified available aircraft routes, phantom routes, and modified phantom routes, and thereafter determining feasibility and marginal values of said reparations, and comparing said marginal values of feasible said reparations to provide optimal solutions that repair all said grounded aircraft routes specified in said aircraft problem specification.

2. The automated, real-time aircraft optimization engine of claim 1, wherein said integrated combination of operations includes at least one of unary operations, binary operations, three-way operations, and reverse binary operations.

3. The automated, real time aircraft optimization engine of claim 2, wherein said unary operations include at least one of do-nothing operations, cancel operations, uncancel operations, and cancel and uncancel operations.

4. The automated, real time aircraft optimization engine of claim 2, wherein said binary operations include move operations, swap operations, move and cancel from source operations, move and cancel from target operations, move and cancel from source and target operations, move and uncancel to source operations, move and uncancel to target operations, swap and cancel from source operations, swap and cancel from target operations, swap and cancel from source and target operations, swap and uncancel to source operations, and swap and uncancel to target operations.

5. The automated, real time aircraft optimization engine of claim 1, wherein said feasibility of said multiple solutions is determined by compliance with user requirements and operations constraints.

6. The automated, real time aircraft optimization engine of claim 1, wherein said marginal values are determined through a decision tree selection of one of said plural marginal value calculators for application to feasible ones of said multiple solutions.

7. The automated, real time aircraft optimization engine of claim 1, wherein said plural marginal value calculators are dynamic, hierarchical calculators that permit use of multiple, prioritized, and weighted route and operation attributes in comparing said marginal values to select said optimal solutions.

8. The automated, real time aircraft optimization engine of claim 1, wherein said microprocessor streamlines generation of said multiple solutions through application of solution conditions.

9. The automated, real time aircraft optimization engine of claim 1, wherein said flight leg creations include ferry flights.

10. The automated, real time aircraft optimization engine of claim 1, wherein said flight leg cancelations are stored in phantom routes for use in uncancel operations.

11. An automated method of repairing airline flight schedules in real time, which comprises the steps of:

receiving memory objects from a memory system which depict current, entire flight environments for at least one airline;

receiving an aircraft problem specification from a user by way of a user interface;

selecting through decision tree logic one of plural marginal value calculators;

selecting a grounded aircraft route from said aircraft problem specification as a first available aircraft route;

creating an incumbent solution which during a first cycle of said automated method for said grounded aircraft route is set to null;

applying unary operations to said grounded aircraft route to generate first reparations comprising at least one of a first modified grounded aircraft route, first phantom routes, and first modified phantom routes, evaluating feasibility of said first reparations, applying said one of said plural marginal value calculators to said first reparations, and replacing said incumbent solution if marginal value of said first reparations exceeds that of said incumbent solution;

selecting a second available aircraft route from said memory objects;

applying binary operations to said grounded aircraft route and said second available aircraft route to generate second reparations comprising second modified grounded aircraft routes, first modified second available aircraft routes, second phantom routes, and second modified phantom routes, evaluating feasibility of said second reparations, applying said one of said plural marginal value calculators to said second reparations, and replacing said incumbent solution if marginal value of said second reparations exceeds that of said incumbent solution;

selecting a third available aircraft route from said memory objects;

applying three-way operations to said grounded aircraft route, said second available aircraft route, and said third available aircraft route to generate third reparations comprising third modified grounded aircraft routes, second modified second available aircraft routes, and first modified third available aircraft routes, evaluating feasibility of said third reparations, applying said one of said plural marginal value calculators to said third reparations, and replacing said incumbent solution if marginal value of said third reparations exceeds that of said incumbent solution;

if additional available aircraft routes exist, select one of said additional available aircraft routes as said third available aircraft route, and repeat the step of applying three-way operations until all of said additional available aircraft routes are processed as said third available aircraft route;

if said additional available aircraft routes exist, select any one of said additional available aircraft routes as said second available aircraft route, and repeat the above steps beginning with the step of applying binary operations until all of said additional available aircraft routes are processed as said second available aircraft route;

committing said incumbent solution to repair said grounded aircraft route and form a solution;

if additional grounded aircraft routes exist, select another grounded aircraft route as said first available aircraft route and repeat the above steps beginning with the step of applying unary operations until all of said additional grounded aircraft routes are processed and repaired as said first available aircraft route to form one solution which repairs all grounded aircraft routes;

if additional solutions are desired, select through said decision tree logic another one of said plural marginal value calculators and repeat the above steps beginning with the step of selecting said grounded aircraft route; and outputting all solutions to said user.

12. The automated method of claim 11, further including after the step of applying binary operations, the step of applying reverse binary operations to said grounded aircraft route and said second available aircraft route to generate fourth reparations comprising fourth modified grounded aircraft routes, third modified second available aircraft routes, third phantom routes, and third modified phantom routes, evaluating feasibility of said fourth reparations, applying said one of said plural marginal value calculators to said fourth reparations, and replacing said incumbent solution if marginal value of said fourth reparations exceeds that of said incumbent solution.

13. The automated method of claim 12, wherein solution conditions in said flight environments, operations constraints, and user requirements are applied to streamline execution of said unary operations, said binary operations, said reverse binary operations, and said three-way operations to avoid generating infeasible routes, and to accelerate repair of said grounded aircraft route.

14. The automated method of claim 11, wherein said feasibility evaluator and said plural marginal value calculators act in concert to seek feasible optimal solutions which affect as few available aircraft routes as possible.

15. The automated method of claim 11, wherein the step of applying three-way operations includes the steps of:

selecting a first sequence of flights from said grounded aircraft route;

selecting a second sequence of flights from said second available aircraft route;

selecting a third sequence of flights from said third available aircraft route;

replacing said first sequence of flights in said grounded aircraft route with said second sequence of flights from said second available aircraft route;

replacing said second sequence of flights from said second available aircraft route with said third sequence of flights from said third available aircraft route;

replacing said third sequence of flights from said third available aircraft route with said first sequence of flights removed from said grounded aircraft route;

evaluating a data set comprising said grounded aircraft route as modified, said second available aircraft route as modified, and said third available aircraft route as modified to determine feasibility, calculating marginal value of said data set through use of said one of said plural marginal value calculators, and replacing said incumbent solution if marginal value of said data set exceeds that of said incumbent solution;

repeating selection of said third sequence of flights from said third available aircraft route and then repeating the above steps beginning with the step of replacing said second sequence of flights until all sequences of flights from said third available aircraft route are selected;

repeating selection of said second sequence of flights from said second available aircraft route and repeating the above steps beginning with the step of selecting said third sequence of flights until all sequences of flights from said second available aircraft route are selected; and repeating selection of said first sequence of flights from said grounded aircraft route and repeating the above steps beginning with the step of selecting said second sequence of flights from said second available aircraft route until all sequences of flights from said grounded aircraft route are selected.

16. The automated method of claim 11, wherein the step of selecting through decision tree logic includes the steps of:

selecting a base marginal value calculator;

generating a solution using said base marginal value calculator;

comparing attributes of said solution to decision-making criteria to select a next marginal value calculator from said plural marginal value calculators;

generating a next solution using said next marginal value calculator, and if desired, comparing attributes of said next solution to decision-making criteria to select another marginal value calculator, and repeating steps of generating and comparing until a desired quantity of solutions is generated.

17. The automated method of claim 12, wherein the step of applying said one of said plural marginal value calculators includes the steps of:

determining attributes of a reparation as created;

applying highest objective of said one of said plural marginal value calculators to said attributes to calculate a marginal value of said reparation;

comparing said marginal value of said reparation to a marginal value of said incumbent solution, and replacing said incumbent solution if said marginal value of said reparation exceeds that of said incumbent solution;

if, for said highest objective, neither said reparation nor said incumbent solution can be determined to have a greater marginal value, remove said highest objective and repeat the above steps beginning with the step of applying highest objective using a next highest remaining objective; and if, for said highest objective, said incumbent solution is determined to have greater marginal value than said reparation, cease operation.

18. The automated method of claim 3, wherein said uncancel operations include the steps of:

receiving an insertion point in one of said grounded aircraft routes during execution of said unary operations;

selecting a phantom route;

selecting a sequence of flights from said phantom route;

removing said sequence of flights from said phantom route and inserting said sequence of flights into said one of said grounded aircraft routes at said insertion point;

evaluating a data set comprising said one of said grounded aircraft routes as modified, and said phantom route as modified to determine feasibility, and if feasible calculating a marginal value of said data set through use of one of plural marginal value calculators, and replacing an incumbent solution if said marginal value of said data set exceeds that of said incumbent solution;

repeating selection of sequence of flights from said phantom route and repeating the above steps beginning with the step of removing a sequence of flights until all sequences of flights in said phantom route are selected;

repeating selection of phantom route and repeating above steps beginning with the step of selecting a sequence of fights until all phantom routes are selected.

19. An automated, real-time aircraft optimization engine for generating multiple solutions to repair disruptions in aircraft routes, which comprises:

a memory system having stored therein memory objects defining an existing flight environment;

an optimization server receiving an aircraft problem specification including user requirements from a user; and a microprocessor in electrical communication with said memory system and said optimization server, and receiving said memory objects and said aircraft problem specification, for generating multiple solutions through use of a marginal value calculator and an integrated combination of operations on grounded aircraft routes and available aircraft routes to provide optimal solutions that repair all said grounded aircract routes specified in said aircraft problem specification.

20. An automated, real-time aircraft optimization engine for generating multiple solutions to repair disruptions in aircraft routes, which comprises:

a memory system having stored therein memory objects defining an existing flight environment;

an optimization server receiving an aircraft problem specification including user requirements from a user;

a microprocessor in electrical communication with said memory system and said optimization server, and receiving said memory objects and said aircraft problem specification, for generating multiple solutions through use of plural marginal value calculators and an integrated combination of operations on grounded aircraft routes, and thereafter determining feasibility and marginal values of said reparations, and comparing said marginal values of feasible ones of said reparations to provide optimal solutions that repair all said grounded aircraft routes specified in said aircraft problem specification.

21. A method of generating multiple solutions to repair disruptions in grounded aircraft routes in real time, which comprises the steps of:

receiving flight environment data and user requirements;

applying an integrated combination of operations to said grounded aircraft routes and available aircraft routes to produce reparations for said grounded aircraft routes;

determining feasibility of said reparations by comparing said reparations with said flight environment data and said user requirements;

determining marginal values of feasible ones of said reparations; and comparing said marginal values of said feasible ones to provide optimal solutions that repair all said grounded aircraft routes.

* * * * *